United States Patent
Weingarten et al.

(10) Patent No.: US 9,372,792 B1
(45) Date of Patent: Jun. 21, 2016

(54) ADVANCED MANAGEMENT OF A NON-VOLATILE MEMORY

(71) Applicant: DENSBITS TECHNOLOGIES LTD., Haifa (IL)

(72) Inventors: Hanan Weingarten, Herzelia (IL); Michael Katz, Haifa (IL); Ilan Bar, Kiryat Motzkin (IL)

(73) Assignee: AVAGO TECHNOLOGIES GENERAL IP (SINGAPORE) PTE. LTD., Yishun (SG)

( * ) Notice: Subject to any disclaimer, the term of this patent is extended or adjusted under 35 U.S.C. 154(b) by 324 days.

(21) Appl. No.: 14/050,913

(22) Filed: Oct. 10, 2013

Related U.S. Application Data

(63) Continuation-in-part of application No. 13/859,497, filed on Apr. 9, 2013, which is a continuation-in-part of application No. 13/434,083, filed on Mar. 29, 2012, now Pat. No. 8,996,790.

(60) Provisional application No. 61/485,397, filed on May 12, 2011.

(51) Int. Cl.
*G06F 12/00* (2006.01)
*G06F 12/02* (2006.01)

(52) U.S. Cl.
CPC .... *G06F 12/0246* (2013.01); *G06F 2212/7203* (2013.01)

(58) Field of Classification Search
CPC .................. G06F 12/0246; G06F 2212/7203
See application file for complete search history.

(56) References Cited

U.S. PATENT DOCUMENTS

| | | |
|---|---|---|
| 4,430,701 A | 2/1984 | Christian et al. |
| 4,463,375 A | 7/1984 | Macovski |
| 4,584,686 A | 4/1986 | Fritze |
| 4,589,084 A | 5/1986 | Fling et al. |
| 4,777,589 A | 10/1988 | Boettner et al. |
| 4,866,716 A | 9/1989 | Weng |
| 5,003,597 A | 3/1991 | Merkle |
| 5,077,737 A | 12/1991 | Leger et al. |
| 5,297,153 A | 3/1994 | Baggen et al. |
| 5,305,276 A | 4/1994 | Uenoyama |
| 5,592,641 A | 1/1997 | Doyle et al. |
| 5,623,620 A | 4/1997 | Alexis et al. |
| 5,640,529 A | 6/1997 | Hasbun |

(Continued)

OTHER PUBLICATIONS

Search Report of PCT Patent Application WO 2009/118720 A3, Mar. 4, 2010.

(Continued)

*Primary Examiner* — Reginald Bragdon
*Assistant Examiner* — Mehdi Namazi
(74) *Attorney, Agent, or Firm* — Reches Patents

(57) ABSTRACT

A method of managing a non-volatile memory module, the method may include: receiving data sectors during a set of at least one write transactions; selecting, out of the currently buffered portions, to-be-merged memory space portions and to-be-cleaned memory space portions; merging, for each to-be-merged memory space portion and before the buffer becomes full, data sectors that belong to the to-be-merged memory space portion into a sequential portion of the non-volatile memory module, wherein the sequential portion differs from the buffer; and copying, for each to-be-cleaned memory space and before the buffer becomes full, data sectors that belong to the to-be-cleaned memory space portion into a buffer block of the buffer.

26 Claims, 26 Drawing Sheets

(56) References Cited

U.S. PATENT DOCUMENTS

| | | |
|---|---|---|
| 5,657,332 A | 8/1997 | Auclair et al. |
| 5,663,901 A | 9/1997 | Harari et al. |
| 5,724,538 A | 3/1998 | Morris et al. |
| 5,729,490 A | 3/1998 | Calligaro et al. |
| 5,740,395 A | 4/1998 | Wells et al. |
| 5,745,418 A | 4/1998 | Hu et al. |
| 5,778,430 A | 7/1998 | Ish et al. |
| 5,793,774 A | 8/1998 | Usui et al. |
| 5,920,578 A | 7/1999 | Zook et al. |
| 5,926,409 A | 7/1999 | Engh et al. |
| 5,933,368 A | 8/1999 | Hu et al. |
| 5,956,268 A | 9/1999 | Lee |
| 5,956,473 A | 9/1999 | Hu et al. |
| 5,968,198 A | 10/1999 | Balachandran |
| 5,982,659 A | 11/1999 | Irrinki et al. |
| 6,011,741 A | 1/2000 | Harari et al. |
| 6,016,275 A | 1/2000 | Han |
| 6,038,634 A | 3/2000 | Ji et al. |
| 6,081,878 A | 6/2000 | Estakhri et al. |
| 6,094,465 A | 7/2000 | Stein et al. |
| 6,119,245 A | 9/2000 | Hiratsuka |
| 6,182,261 B1 | 1/2001 | Haller et al. |
| 6,192,497 B1 | 2/2001 | Yang et al. |
| 6,195,287 B1 | 2/2001 | Hirano |
| 6,199,188 B1 | 3/2001 | Shen et al. |
| 6,209,114 B1 | 3/2001 | Wolf et al. |
| 6,259,627 B1 | 7/2001 | Wong |
| 6,272,052 B1 | 8/2001 | Miyauchi |
| 6,278,633 B1 | 8/2001 | Wong et al. |
| 6,279,133 B1 | 8/2001 | Vafai et al. |
| 6,301,151 B1 | 10/2001 | Engh et al. |
| 6,370,061 B1 | 4/2002 | Yachareni et al. |
| 6,374,383 B1 | 4/2002 | Weng |
| 6,504,891 B1 | 1/2003 | Chevallier |
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,675,281 B1 | 1/2004 | Oh et al. |
| 6,704,902 B1 | 3/2004 | Shinbashi et al. |
| 6,751,766 B2 | 6/2004 | Guterman et al. |
| 6,772,274 B1 | 8/2004 | Estakhri |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,968,421 B2 | 11/2005 | Conley |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,188,228 B1 | 3/2007 | Chang et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,212,426 B2 | 5/2007 | Park et al. |
| 7,290,203 B2 | 10/2007 | Emma et al. |
| 7,292,365 B2 | 11/2007 | Knox |
| 7,301,928 B2 | 11/2007 | Nakabayashi et al. |
| 7,315,916 B2 | 1/2008 | Bennett et al. |
| 7,388,781 B2 | 6/2008 | Litsyn et al. |
| 7,395,404 B2 | 7/2008 | Gorobets et al. |
| 7,441,067 B2 | 10/2008 | Gorobets et al. |
| 7,443,729 B2 | 10/2008 | Li et al. |
| 7,450,425 B2 | 11/2008 | Aritome |
| 7,454,670 B2 | 11/2008 | Kim et al. |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,610,433 B2 | 10/2009 | Randell et al. |
| 7,613,043 B2 | 11/2009 | Cornwell et al. |
| 7,619,922 B2 | 11/2009 | Li et al. |
| 7,697,326 B2 | 4/2010 | Sommer et al. |
| 7,706,182 B2 | 4/2010 | Shalvi et al. |
| 7,716,538 B2 | 5/2010 | Gonzalez et al. |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,911,848 B2 | 3/2011 | Eun et al. |
| 7,961,797 B1 | 6/2011 | Yang et al. |
| 7,975,192 B2 | 7/2011 | Sommer et al. |
| 8,020,073 B2 | 9/2011 | Emma et al. |
| 8,108,590 B2 | 1/2012 | Chow et al. |
| 8,122,328 B2 | 2/2012 | Liu et al. |
| 8,159,881 B2 | 4/2012 | Yang |
| 8,190,961 B1 | 5/2012 | Yang et al. |
| 8,250,324 B2 | 8/2012 | Haas et al. |
| 8,300,823 B2 | 10/2012 | Bojinov et al. |
| 8,305,812 B2 | 11/2012 | Levy et al. |
| 8,327,246 B2 | 12/2012 | Weingarten et al. |
| 8,407,560 B2 | 3/2013 | Ordentlich et al. |
| 8,417,893 B2 | 4/2013 | Khmelnitsky et al. |
| 2001/0034815 A1 | 10/2001 | Dugan et al. |
| 2002/0063774 A1 | 5/2002 | Hillis et al. |
| 2002/0085419 A1 | 7/2002 | Kwon et al. |
| 2002/0154769 A1 | 10/2002 | Petersen et al. |
| 2002/0156988 A1 | 10/2002 | Toyama et al. |
| 2002/0174156 A1 | 11/2002 | Birru et al. |
| 2003/0014582 A1 | 1/2003 | Nakanishi |
| 2003/0065876 A1 | 4/2003 | Lasser |
| 2003/0101404 A1 | 5/2003 | Zhao et al. |
| 2003/0105620 A1 | 6/2003 | Bowen |
| 2003/0177300 A1 | 9/2003 | Lee et al. |
| 2003/0192007 A1 | 10/2003 | Miller et al. |
| 2004/0015771 A1 | 1/2004 | Lasser et al. |
| 2004/0030971 A1 | 2/2004 | Tanaka et al. |
| 2004/0059768 A1 | 3/2004 | Denk et al. |
| 2004/0080985 A1 | 4/2004 | Chang et al. |
| 2004/0153722 A1 | 8/2004 | Lee |
| 2004/0153817 A1 | 8/2004 | Norman et al. |
| 2004/0181735 A1 | 9/2004 | Xin |
| 2004/0203591 A1 | 10/2004 | Lee |
| 2004/0210706 A1 | 10/2004 | In et al. |
| 2005/0013165 A1 | 1/2005 | Ban |
| 2005/0018482 A1 | 1/2005 | Cemea et al. |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le-Bars et al. |
| 2005/0144213 A1 | 6/2005 | Simkins et al. |
| 2005/0144368 A1 | 6/2005 | Chung et al. |
| 2005/0169057 A1 | 8/2005 | Shibata et al. |
| 2005/0172179 A1 | 8/2005 | Brandenberger et al. |
| 2005/0213393 A1 | 9/2005 | Lasser |
| 2005/0243626 A1 | 11/2005 | Ronen |
| 2006/0059406 A1 | 3/2006 | Micheloni et al. |
| 2006/0059409 A1 | 3/2006 | Lee |
| 2006/0064537 A1 | 3/2006 | Oshima et al. |
| 2006/0101193 A1 | 5/2006 | Murin |
| 2006/0195651 A1 | 8/2006 | Estakhri et al. |
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0282411 A1 | 12/2006 | Fagin et al. |
| 2006/0284244 A1 | 12/2006 | Forbes et al. |
| 2006/0294312 A1 | 12/2006 | Walmsley |
| 2007/0025157 A1 | 2/2007 | Wan et al. |

(56) References Cited

U.S. PATENT DOCUMENTS

| | | |
|---|---|---|
| 2007/0063180 A1 | 3/2007 | Asano et al. |
| 2007/0081388 A1 | 4/2007 | Joo |
| 2007/0098069 A1 | 5/2007 | Gordon |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0140006 A1 | 6/2007 | Chen et al. |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata et al. |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2007/0297226 A1 | 12/2007 | Mokhlesi |
| 2008/0010581 A1 | 1/2008 | Alrod et al. |
| 2008/0028014 A1 | 1/2008 | Hilt et al. |
| 2008/0049497 A1 | 2/2008 | Mo |
| 2008/0055989 A1 | 3/2008 | Lee et al. |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0112238 A1 | 5/2008 | Kim et al. |
| 2008/0116509 A1 | 5/2008 | Harari et al. |
| 2008/0126686 A1 | 5/2008 | Sokolov et al. |
| 2008/0127104 A1 | 5/2008 | Li et al. |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0137414 A1 | 6/2008 | Park et al. |
| 2008/0141043 A1 | 6/2008 | Flynn et al. |
| 2008/0148115 A1 | 6/2008 | Sokolov et al. |
| 2008/0158958 A1 | 7/2008 | Shalvi et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0201620 A1 | 8/2008 | Gollub |
| 2008/0209114 A1 | 8/2008 | Chow et al. |
| 2008/0219050 A1 | 9/2008 | Shalvi et al. |
| 2008/0225599 A1 | 9/2008 | Chae |
| 2008/0250195 A1 | 10/2008 | Chow et al. |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0027961 A1 | 1/2009 | Park et al. |
| 2009/0043951 A1 | 2/2009 | Shalvi et al. |
| 2009/0046507 A1 | 2/2009 | Aritome |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn et al. |
| 2009/0132755 A1 | 5/2009 | Radke |
| 2009/0144598 A1 | 6/2009 | Yoon et al. |
| 2009/0144600 A1 | 6/2009 | Perlmutter et al. |
| 2009/0150599 A1 | 6/2009 | Bennett |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2009/0282185 A1 | 11/2009 | Van Cauwenbergh |
| 2009/0282186 A1 | 11/2009 | Mokhlesi et al. |
| 2009/0287930 A1 | 11/2009 | Nagaraja |
| 2009/0300269 A1 | 12/2009 | Radke et al. |
| 2009/0323942 A1 | 12/2009 | Sharon et al. |
| 2010/0005270 A1 | 1/2010 | Jiang |
| 2010/0025811 A1 | 2/2010 | Bronner et al. |
| 2010/0030944 A1 | 2/2010 | Hinz |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0149881 A1 | 6/2010 | Lee et al. |
| 2010/0172179 A1 | 7/2010 | Gorobets et al. |
| 2010/0174853 A1 | 7/2010 | Lee et al. |
| 2010/0180073 A1 | 7/2010 | Weingarten et al. |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0241793 A1 | 9/2010 | Sugimoto et al. |
| 2010/0246265 A1 | 9/2010 | Moschiano et al. |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0269008 A1 | 10/2010 | Leggette et al. |
| 2010/0293321 A1 | 11/2010 | Weingarten |
| 2010/0318724 A1 | 12/2010 | Yeh |
| 2011/0051521 A1 | 3/2011 | Levy et al. |
| 2011/0055461 A1 | 3/2011 | Steiner et al. |
| 2011/0093650 A1 | 4/2011 | Kwon et al. |
| 2011/0096612 A1 | 4/2011 | Steiner et al. |
| 2011/0099460 A1 | 4/2011 | Dusija et al. |
| 2011/0119562 A1 | 5/2011 | Steiner et al. |
| 2011/0153919 A1 | 6/2011 | Sabbag |
| 2011/0161775 A1 | 6/2011 | Weingarten |
| 2011/0194353 A1 | 8/2011 | Hwang et al. |
| 2011/0209028 A1 | 8/2011 | Post et al. |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |
| 2012/0017136 A1 | 1/2012 | Ordentlich et al. |
| 2012/0051144 A1 | 3/2012 | Weingarten et al. |
| 2012/0063227 A1 | 3/2012 | Weingarten et al. |
| 2012/0066441 A1 | 3/2012 | Weingarten |

(56) References Cited

U.S. PATENT DOCUMENTS

| | | |
|---|---|---|
| 2012/0110250 A1 | 5/2012 | Sabbag et al. |
| 2012/0124273 A1 | 5/2012 | Goss et al. |
| 2012/0246391 A1 | 9/2012 | Meir et al. |

OTHER PUBLICATIONS

Search Report of PCT Patent Application WO 2009/095902 A3, Mar. 4, 2010.
Search Report of PCT Patent Application WO 2009/078006 A3, Mar. 4, 2010.
Search Report of PCT Patent Application WO 2009/074979 A3, Mar. 4, 2010.
Search Report of PCT Patent Application WO 2009/074978 A3, Mar. 4, 2010.
Search Report of PCT Patent Application WO 2009/072105 A3, Mar. 4, 2010.
Search Report of PCT Patent Application WO 2009/072104 A3, Mar. 4, 2010.
Search Report of PCT Patent Application WO 2009/072103 A3, Mar. 4, 2010.
Search Report of PCT Patent Application WO 2009/072102 A3, Mar. 4, 2010.
Search Report of PCT Patent Application WO 2009/072101 A3, Mar. 4, 2010.
Search Report of PCT Patent Application WO 2009/072100 A3, Mar. 4, 2010.
Search Report of PCT Patent Application WO 2009/053963 A3, Mar. 4, 2010.
Search Report of PCT Patent Application WO 2009/053962 A3, Mar. 4, 2010.
Search Report of PCT Patent Application WO 2009/053961 A3, Mar. 4, 2010.
Search Report of PCT Patent Application WO 2009/037697 A3, Mar. 4, 2010.
Yani Chen, Kcshab K. Parhi, "Small Area Parallel Chien Search Architectures for Long BCH Codes", Ieee Transactions on Very Large Scale Integration(VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, pp. II-369-72 vol. 2.
Michael Purser, "Introduction to Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips.com), Oct. 2005.
Todd K.Moon, "Error Correction Coding Mathematical Methods and Algorithms", A John Wiley & Sons, Inc., 2005.
Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000.
Giovanni Campardo, Rino Micheloni, David Novosel, "VLSI-Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built in Self Diagnosis", ITC International Test Conference, Paper 2.1, Feb. 2005.
J.M. Portal, H. Aziza, D. Nee, "EEPROM Diagnosis Based on Threshold Voltage Embedded Measurement", Journal of Electronic Testing: Theory and Applications 21, 33-42, 2005.
G. Tao, A. Scarpa, J. J Dijkstra, W. Stidl, F. Kuper, "Data retention prediction for modern floating gate non-volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com , 2005.
Paulo Cappelletti, Clara Golla, Piero Olivo, Enrico Zanoni, "Flash Memories", Kluwer Academic Publishers, 1999.
JEDEC Standard, "Stress-Test-Driven Qualification of Integrated Circuits", JEDEC Solid State Technology Association. JEDEC Standard No. 47F pp. 1-26, Dec. 2007.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.
Daneshbeh, "Bit Serial Systolic Architectures for Multiplicative Inversion and Division over GF (2)", A thesis presented to the University of Waterloo, Ontario, Canada, 2005, pp. 1-118.
Chen, Formulas for the solutions of Quadratic Equations over GF (2), IEEE Trans. Inform. Theory, vol. IT-28, No. 5, Sep. 1982, pp. 792-794.
Berlekamp et al., "On the Solution of Algebraic Equations over Finite Fields", Inform. Cont. 10, Oct. 1967, pp. 553-564.

```
┌─────────────────────────────────────────────────────────────────────┐
│ Receiving data sectors during a set of at least one write transactions.Each data sector │
│ belongs to a memory space portion out of multiple memory space portions. 2610 │
└─────────────────────────────────────────────────────────────────────┘
                                    ↓
┌─────────────────────────────────────────────────────────────────────┐
│ Writing the data sectors into a buffer of the non-volatile memory device. The buffer │
│ comprises multiple buffer blocks. The multiple memory space portions comprise │
│ currently buffered memory space portions that are associated with currently buffered │
│ data sectors. 2620 │
└─────────────────────────────────────────────────────────────────────┘
                                    ↓
┌─────────────────────────────────────────────────────────────────────┐
│ Selecting, out of the currently buffered portions, to-be-merged memory space │
│ portions and to-be-cleaned memory space portions. The selection is made while │
│ trying to maintain a target ratio (alpha) within a range that has an upper limit and a │
│ lower limit. The upper limit differs from the lower limit and exceeds one half. The │
│ target ratio is a ratio between (a) a number of to-be-cleaned memory space portions │
│ and (b) a sum of the number of to-be-cleaned memory space portions and a number │
│ of to-be-merged memory space portions. 2630 │
│  ┌───────────────────────────────────────────────────────────────┐  │
│  │ Determining an inter-fragment threshold that represents a number of data │  │
│  │ segments to be written to the buffer between an execution of two consecutive │  │
│  │ fragments of any type of fragment out of merging fragments and cleaning │  │
│  │ fragment. 2650 │  │
│  └───────────────────────────────────────────────────────────────┘  │
└─────────────────────────────────────────────────────────────────────┘
                                    ↓
┌─────────────────────────────────────────────────────────────────────┐
│ Merging, for each to-be-merged memory space portion and before the buffer │
│ becomes full, data sectors that belong to the to-be-merged memory space portion │
│ into a sequential portion of the non-volatile memory device, wherein the sequential │
│ portion differs from the buffer; and copying, for each to-be-cleaned memory space │
│ and before the buffer becomes full, data sectors that belong to the to-be-cleaned │
│ memory space portion into a buffer block of the buffer. 2640 │
│  ┌───────────────────────────────────────────────────────────────┐  │
│  │ Executing multiple merging fragments and wherein the copying comprises │  │
│  │ executing multiple cleaning fragments. 2642 │  │
│  └───────────────────────────────────────────────────────────────┘  │
└─────────────────────────────────────────────────────────────────────┘

ADVANCED MANAGEMENT OF A NON-VOLATILE MEMORY

CROSS REFERENCE TO RELATED APPLICATIONS

This application is a continuation in part of U.S. patent application Ser. No. 13/859,497, filed on Apr. 9, 2013, entitled "ADVANCED MANAGEMENT OF A NON-VOLATILE MEMORY," which is a continuation in part of U.S. patent application Ser. No. 13/434,083, filed on Mar. 29, 2012, entitled "SYSTEM AND METHOD FOR FLASH MEMORY MANAGEMENT," which claims priority from U.S. provisional patent Ser. No. 61/485,397, filed on May 12, 2011, all applications are incorporated herein by reference in their entireties. This application is also related to a continuation-in-part application Ser. No. 14/045,681, filed on Oct. 3, 2013, which claims the same priority data as the current application, the disclosure of which is incorporated herein by reference in its entirety.

BACKGROUND

Flash memory devices store information with high density on Flash cells with ever smaller dimensions. In addition, Multi-Level Cells (MLC) store several bits per cell by setting the amount of charge in a cell. Flash memory devices are organized into (physical) pages. Each page includes a section allocated for data (512 bytes-8 Kbytes and expected larger in the future) and a small amount of spare bytes (64-512 or more bytes for every page) for storing redundancy and metadata. The redundancy bytes are used to store error correcting information, for correcting errors which may have occurred during flash lifetime and the page read process. Each program operation is performed on an entire page. A number of pages are grouped together to form an Erase Block (erase block). A page cannot be erased unless the entire erase block which contains it is erased.

One common application of flash memory devices is Secure Digital (SD) cards and embedded Multi-Media Cards (eMMC). An SD/eMMC card may typically contain flash memory devices and a flash memory controller. The controller translates commands coming in through the SD/eMMC interface into actions (Read/Write/Erase) on the flash memory devices. The most common SD/eMMC commands may be Read and Write commands of one or more sectors, where a sector may be, but is not limited to, a sequence of 512 bytes. The Read or Write commands may be of a single sector or multiple sectors. These commands may refer to logical addresses. These addresses may then be redirected to new addresses on the flash memory which need not directly correspond to the logical addresses that might be referenced by the Read or Write commands. This is due to memory management that may be carried out by the flash memory controller in order to support several features such as wear-leveling, bad block management, firmware code and data, error-correction, and others. The erase function is performed on an entire erase block. Because of this functionality, before the data of a certain block may be replaced such as during a write function, the new data must be written in an alternative location before an erase can occur, to preserve the integrity of the stored data.

Due to the small dimensions of a typical SD/eMMC card and the price limitations, the controller may typically have only a small RAM available for storage. The small size of the RAM memory limits the type of memory management which may be carried out by the controller with regard to the data stored in the flash memory device and received from the interface.

The controller may typically manage the memory at the erase block level, because managing data of small particle sizes becomes difficult. That is, the logical memory space may be divided into units of memory contained within a single erase block or some constant multiple of erase blocks, such that all logical sector addresses within each said unit of memory may be mapped to the same erase block or some constant multiple thereof.

This type of management has the drawback that for writing random access data sectors to memory or other memory units smaller than an erase block, erase blocks must be frequently rewritten. Because of the characteristics of flash memory, each new piece of information is written into an empty page. In flash memory a page may not be rewritten before the entire erase block is erased first.

If a portion of the memory unit contained within an erase block may need to be rewritten, it is first written into a freshly allocated erased erase block. The remaining, unmodified, contents of the erase block may then be copied into the new erase block and the former erase-block may be declared as free and may be further erased. This operation may be referred to as "sealing" or "merging". The operation involves collecting the most recent data of a logical block and then merging it with the rest of the block data in a single erase block. Thus, even if a single sector from an erase block is rewritten, a complete erase block would be rewritten.

This may result in causing a significant degradation in the average write speed. It may also impose a significant delay in the response time between random write sector operations. It also may cause excessive P/E (program/erase) cycling, which may be problematic in new generations of flash memory devices where the number of P/E cycles is limited to a few thousand or even a few hundreds.

The controller is used to manage the overhead described above, and must always keep track of the data associated with each logical address and the actual memory location. This is usually achieved by implementing a mapping method between the logical address space assigned to the data and the actual memory storage location of the data.

Several methods may be implemented to execute such a mapping. Two approaches implement mapping systems that rely on block mapping and page mapping, respectively. In an approach using block mapping, each physical block in the flash memory is mapped to a contiguous logical memory block of the same data size (LBA). In this approach when one page in some logical block is updated, the entire associated physical block must be copied to a fresh block, and the new data must be written in place of the obsolete copy. A merge may be an operation where the original content of a logical block is merged with the new data to form a new up to date copy of the block. This up to date copy is the data block that is associated with a logical data block assigned to the data contained within. In the second approach, each logical page of a logical block is mapped to an arbitrary physical page where two pages belonging to the same logical block can reside in different physical blocks of the flash memory. The second approach requires additional complexity in terms of the amount of management data and memory overhead required for the physical memory to logical address mapping tables. For memory applications where severe limitations exist on available control memory, this approach is less appropriate. Flash memories such as SD/eMMC have limited amount of memory overhead and the first mapping approach, or variants thereof are more practical.

SUMMARY

There may be provided a method of managing a non-volatile memory module, the method may include receiving data sectors during a set of at least one write transactions; wherein each data sector belongs to a memory space portion out of multiple memory space portions; writing the data sectors into a buffer of the non-volatile memory module; wherein the buffer comprises multiple buffer blocks; wherein the multiple memory space portions comprise currently buffered memory space portions that are associated with currently buffered data sectors; selecting, out of the currently buffered portions, to-be-merged memory space portions and to-be-cleaned memory space portions; wherein a target ratio between (a) a number of to-be-cleaned memory space portions and (b) a sum of the number of to-be-cleaned memory space portions and a number of th-be-merged memory space portions ranges between an upper limit and a lower limit, wherein the upper limit differs from the lower limit and exceeds one half; merging, for each to-be-merged memory space portion and before the buffer becomes full, data sectors that belong to the to-be-merged memory space portion into a sequential portion of the non-volatile memory module, wherein the sequential portion differs from the buffer; and copying, for each to-be-cleaned memory space and before the buffer becomes full, data sectors that belong to the to-be-cleaned memory space portion into a buffer block of the buffer.

The target ratio may exceed $X/(X+1)$, wherein X may exceed three, four, five and more.

The method may include selecting the to-be-merged memory space portions and the to-be-cleaned memory portions based upon a number of buffered data sectors for each of the currently buffered portions.

The method may include selecting the to-be-merged memory space portions as memory space portions that have higher numbers of buffered data sectors in relation to numbers of buffered data sectors of to-be-cleaned memory space portions.

The method may include selecting the to-be-merged memory space portions as memory space portions that have highest numbers of buffered data sectors out of the currently buffered portions.

The method may include selecting the to-be-cleaned memory space portions as memory space portions that have lowest numbers of buffered data sectors out of the currently buffered portions.

The method may include selecting the to-be-merged memory space portions and the to-be-cleaned memory portions based upon timings of buffering data sectors that belong to the currently buffered portions.

The method may include selecting the to-be-merged memory space portions as memory space portions that have older buffered data sectors in relation to data sectors of to-be-cleaned memory space portions.

The method may include selecting the to-be-merged memory space portions and the to-be-cleaned memory portions based upon (a) a number of buffered data sectors for each of the currently buffered portions, and (b) timings of buffering data sectors that belong to the currently buffered portions.

The method may include: receiving data sectors during multiple sets of at least one write transactions; and repeating the stages of writing, selecting, merging and copying for each set of at least one write transactions to provide multiple actual ratios between numbers of to-be-cleaned memory space portions and to-be-merged memory space portions; wherein the target ratio between each number of to-be-cleaned memory space portions and each number of to-be-merged memory space portions is a statistical function of the multiple actual ratios.

The statistical function may be an average or any other function that applies statistical operators.

The merging may include executing multiple merging fragments and wherein the copying may include executing multiple cleaning fragments.

The multiple merging fragments and multiple cleaning fragments may be executed in an interleaved manner.

The multiple merging fragments and multiple cleaning fragments may be executed in a non-interleaved manner.

The method may include determining an inter-fragment threshold that represents a number of data segments to be written to the buffer between an execution of two consecutive fragments of any type of fragment out of merging fragments and cleaning fragment.

The method may include determining the inter-fragment threshold such as to prevent an overflow of the buffer due to (a) a completion of merging and the copying and (b) a reception of new data sectors during the completion of merging and the copying.

The determining of the inter-fragment threshold may be responsive to a size of a residual buffer space that is allocated for receiving data sectors during an execution of the merging.

The determining of the inter-fragment threshold may be responsive to at least some parameters out of: a number (Np) of data sectors required to fill a buffer block; a size (g) of residual buffer space that is allocated for receiving data sectors during an execution of the merging; a number (Pc) of data sectors copied during an entire cleaning; a number (Nu) of currently not-empty buffer blocks; numbers (L(1)–L(Nu)) of primary memory space portions per each buffer block; wherein a primary memory space portion of a buffer block is a memory space portion of which an earliest written data sector that is still buffered was written to the buffer block; a number (nl) of data sectors per memory space portion; the target ration (alpha); a number (f) of fragments required for completing the merging and the cleaning; a number (NF) of free buffer blocks; and a number (Q) of uncompleted fragments requires for a completion of the merging and copying that are executed when determining of the inter-fragment threshold.

The determining of the inter-fragment threshold may include calculating a maximal value (t) out of intermediate values calculated for different values of an index j that ranges between 1 and Nu of a ratio between a sum of primary space portions per buffer block from L(1) to a k'th primary space portion L(k) for index k values ranging between and j plus g, and (b) a value of index j plus NF minus 1.

The determining of the inter-fragment threshold may include: calculating a first intermediate value that equals $n_e$–Pc; calculating an absolute value (r) of (f*Pc/Np); calculating a second intermediate value that equals Pt*(1-alpha)+Q+r; and calculating the inter-fragment threshold by dividing the first intermediate value by the second intermediate value.

The method may include changing a relationship between the number of to-be-merged memory space portions and to-be-cleaned memory space portions if the first intermediate value is negative.

The method may include selecting memory space portions that are associated with data sectors stored in an oldest buffer block of the buffer; wherein the oldest buffer block stores an earliest written data sector out of all data sectors currently buffered in the buffer.

The method may include checking when the merging and the copying to the buffer block are completed, whether the buffer block is full; and delaying further merging and copying until selecting new to-be-merged memory space portions and new to-be-cleaned memory space portions, if it is determined that the buffer block is not full.

There may be provided a non-transitory computer readable medium that stores instructions that once executed by a memory controller cause the memory controller to: receive data sectors during a set of at least one write transactions; wherein each data sector belongs to a memory space portion out of multiple memory space portions; write the data sectors into a buffer of the non-volatile memory module; wherein the buffer may include multiple buffer blocks; wherein the multiple memory space portions may include currently buffered memory space portions that are associated with currently buffered data sectors; select, out of the currently buffered portions, to-be-merged memory space portions and to-be-cleaned memory space portions; wherein a target ratio between (a) a number of to-be-cleaned memory space portions and (b) a sum of the number of to-be-cleaned memory space portions and a number of th-be-merged memory space portions ranges between an upper limit and a lower limit, wherein the upper limit differs from the lower limit and exceeds one half; merge, for each to-be-merged memory space portion and before the buffer becomes full, data sectors that belong to the to-be-merged memory space portion into a sequential portion of the non-volatile memory module, wherein the sequential portion differs from the buffer; and copy, for each to-be-cleaned memory space and before the buffer becomes full, data sectors that belong to the to-be-cleaned memory space portion into a buffer block of the buffer.

A system, comprising an interface and a memory controller; wherein interface is arranged to receive data sectors during a set of at least one write transactions; wherein each data sector belongs to a memory space portion out of multiple memory space portions; wherein the memory controller is arranged to: write the data sectors into a buffer of a non-volatile memory module; wherein the buffer comprises multiple buffer blocks; wherein the multiple memory space portions comprise currently buffered memory space portions that are associated with currently buffered data sectors; select, out of the currently buffered portions, to-be-merged memory space portions and to-be-cleaned memory space portions; wherein a target ratio between (a) a number of to-be-cleaned memory space portions and (b) a sum of the number of to-be-cleaned memory space portions and a number of th-be-merged memory space portions ranges between an upper limit and a lower limit, wherein the upper limit differs from the lower limit and exceeds one half; merge, for each to-be-merged memory space portion and before the buffer becomes full, data sectors that belong to the to-be-merged memory space portion into a sequential portion of the non-volatile memory module, wherein the sequential portion differs from the buffer; copy, for each to-be-cleaned memory space and before the buffer becomes full, data sectors that belong to the to-be-cleaned memory space portion into a buffer block of the buffer.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 26 illustrates a method according to an embodiment of the invention;

Figure 1:
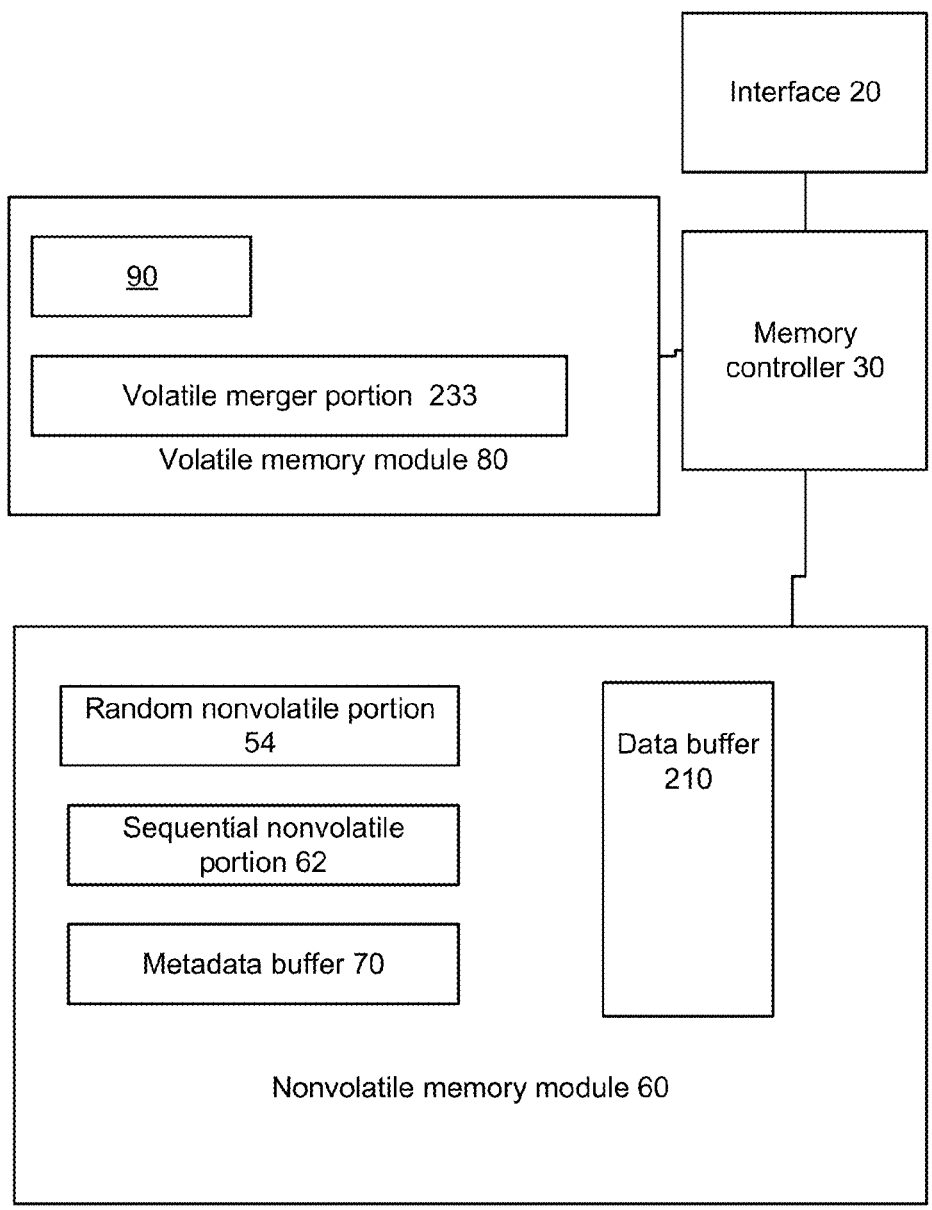
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

U.S. patent application Ser. No. 13/434,083, filing date Mar. 29 2012, titled "SYSTEM AND METHOD FOR FLASH MEMORY MANAGEMENT", which is incorporated herein by reference, teaches of an extended random sector buffer (ERSB) which is used in Flash storage systems employing block mapping to mitigate the need to perform block merge for every input sector, when writing a sequence of sectors to random logical addresses. The ERSB is a collection of auxiliary data blocks which hold short write transactions until a later stage when the data of these transactions are merged to their original logical blocks. When writing short random transactions, the transactions are written contiguously to some ERSB data block. A special data base maps each physical page in the ERSB to a corresponding logical page. When the ERSB becomes full, block merges are initiated for all logical blocks present in the ERSB until the data blocks are freed and new sectors can be written to the ERSB.

It is especially instructive to consider the IOPS behavior of the ERSB system when writing a sequence of write transactions where each write consists of one data sector (e.g., 512 B) or segment (e.g., 4 KB) and where the address of each write transaction is randomly chosen from some test area which is some subset of the user space. In this situation, all transactions are performed initially to the ERSB. Initially, the throughput achieved for these writes is relatively high and is determined primarily by the write speed which is supported by the flash array. As the ERSB becomes close to full, it is necessary to vacate some of its blocks. Since each data block in the ERSB can potentially have pages from all the logical blocks in the test area, in order to vacate even a single data block, it is required to merge a very large population of the logical blocks. The merges require a substantial amount of time, rendering the throughput to be much lower during this time. This situation continues until at least one data block is freed, and then high throughput is restored again.

FIG. 1 illustrates a system 10 according to embodiments of the invention. System 10 includes an interface 20 that may be linked to a memory controller 30 and may be also linked to a nonvolatile memory module 60 and a volatile memory module 80.

The nonvolatile memory module 60 may contain a random portion 54, a sequential portion 62, a data buffer 210 and a metadata buffer 70.

The random portion may refer to a logically allocated random portion memory, while the sequential portion may refer to a logically allocated sequential portion memory. The metadata buffer 70 and other management portions may be allocated within the nonvolatile memory module 60. In FIG. 1 some data structures such as the metadata buffer 70 may be illustrated as being contained outside the random portion 54 or sequential portion 62, although these structures may be contained within nonvolatile memory. It is noted that the data buffer 210 may be included in the random portion 54.

System 10 may store a management data structure that may store metadata about the content of the volatile memory module 80, the content of the nonvolatile memory module 60 or both memory modules. The management data structure can be stored at the volatile memory module 80 and, additionally or alternatively at the nonvolatile memory module 60.

FIG. 1 illustrates volatile memory module 80 and metadata buffer 70 as storing a management data structure 90 that includes location metadata (such as pointer) about a location of data sector in the data buffer 210.

FIG. 1 also illustrates a volatile merger portion 233 that can be used when data sectors are merged. Data sectors that were previously stored at the random portion can be merged before being written to the sequential portion. Additionally or alternatively, the merging can occur between data sectors from sequential and random portions. The merging may include copying data sectors to be merged to volatile merger portion 233 and then writing the merged data sectors to the sequential portion.

Figure 2:
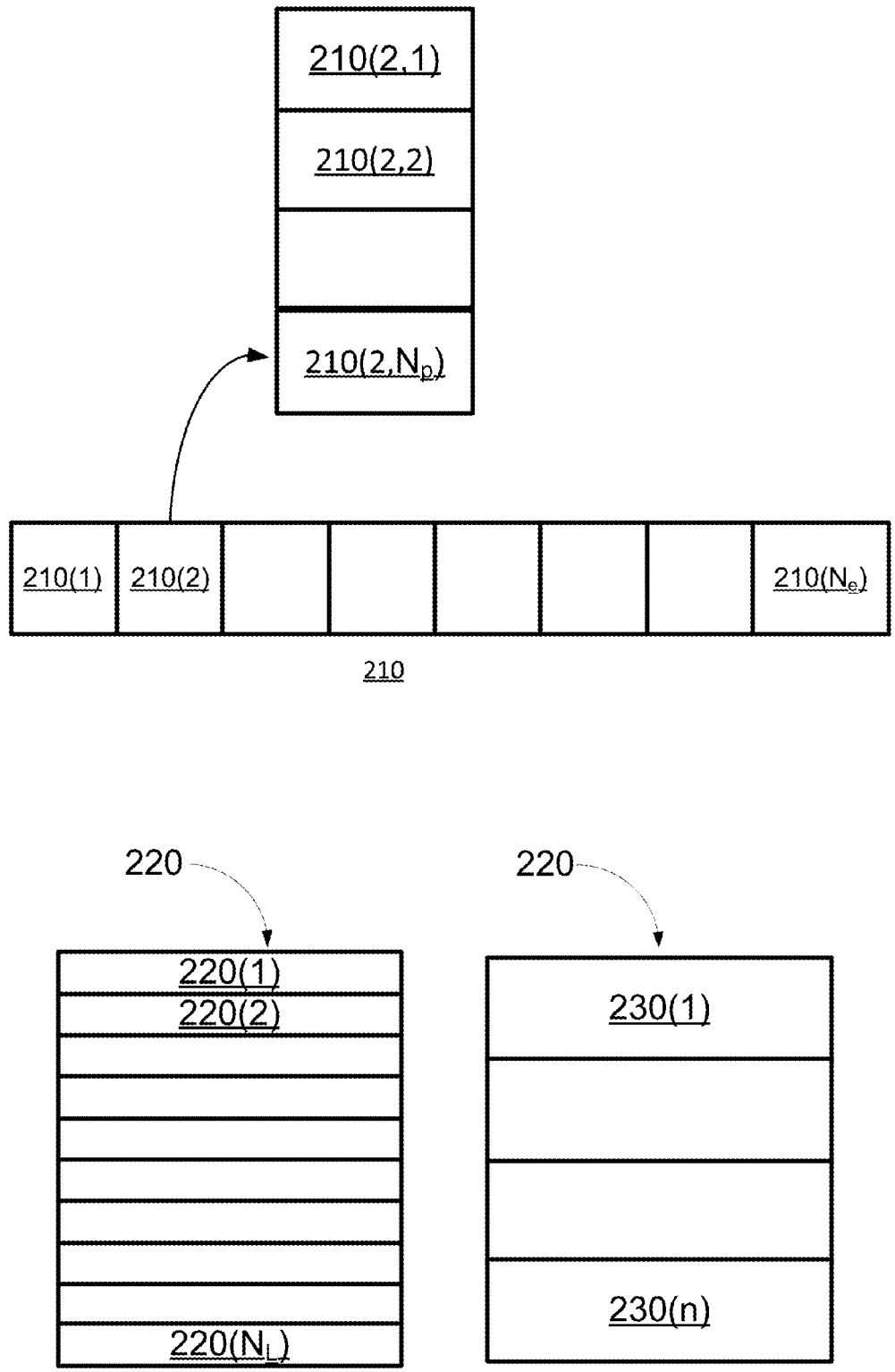
FIG. 2 illustrates data structures according to an embodiment of the invention.

FIG. 2 depicts the content of data buffer 210. Data buffer 210 includes Ne data blocks 210(1)-210(Ne). Each data block may include multiple pages (data block 210(2) is illustrated as including Np data pages 210(2,1)-210(2,Np)). Each page may store one or more data sectors.

A logical memory space (such as a user space) 220 may include multiple (Nl) logical memory blocks (LBAs) 220(1)-220(NL) and may be partitioned to multiple (n) memory subsets—230(1)-230(n).

FIG. 2 illustrates a memory space and a buffer that are characterized by the following parameters:

$N_p$—Number of (4 KB) pages (segments) in a physical block
$N_L$—Number of logical blocks (LBAs)
$N_e$—Number of ERSB data blocks
f—Number of merge fragments (or transaction timeout durations) required to complete a block merge $t_w$—Page write duration [sec]
$t_m$—Merge duration [sec]
For the system in FIGS. 1 and 2, the average IOPS performance is given by $$IOPS = \frac{(N_e - G)N_p}{(N_e - G)N_p t_w + N_L t_m}; G = \left\lceil \frac{fN_L}{N_p} \right\rceil \quad \text{Equation 1}$$

Average *IOPS* when using prior art *ERSB*

Figure 3:
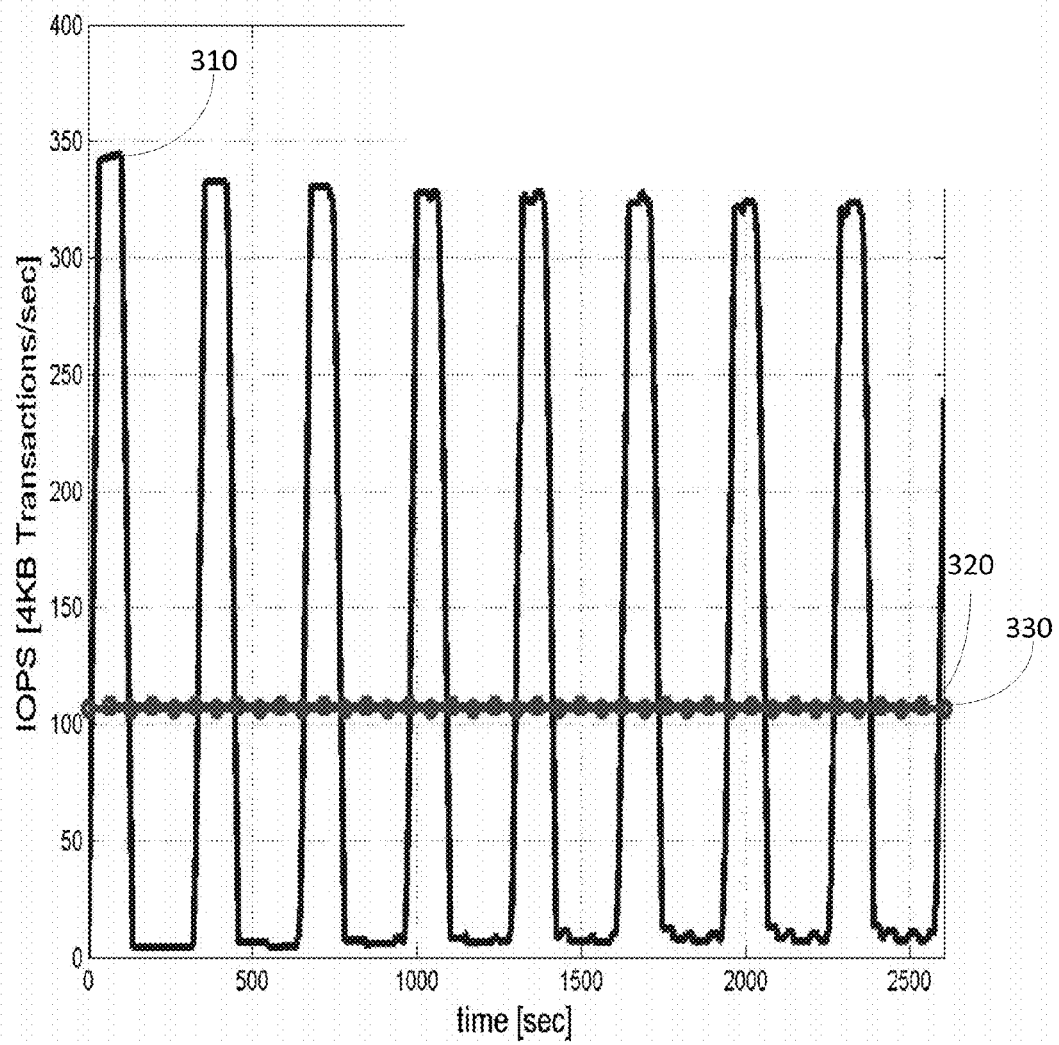
FIG. 3 illustrates the performance of a system according to an embodiment of the invention.

FIG. 3 shows the IOPS performance of a representative ERSB system employing a prior art management scheme with $N_p=600$, $N_L=240$, $N_e=60$, $f=5$, $t_w=0.001$ [sec], and $t_m=1.2$ [sec]. Instantaneous IOPS (curve 310) are the number of 4 KB pages written to the ERSB per second at each time instant (averaged over a 100 sec time window). Theoretical average IOPS (curve 320) are the average number of 4 KB pages written to the ERSB per second as predicted by Equation 1. Empirical average IOPS (curve 330) are the average number of 4 KB pages written to the ERSB per second over the entire time duration as measured in the representative ERSB system.

The suggested methods seek to increase the average IOPS performance of an ERSB system, and to maintain as much as possible a steady level of instantaneous IOPS.

Splitting the User Space into 2 User Space Subsets

One embodiment of the present invention seeks to increases the average IOPS performance of an ERSB system by partitioning the user space into 2 disjoint user subsets (E.g., user subset A and user subset B). A user subset is a collection of logical pages belonging to the user space. The user space is the collection of all the logical pages in the storage system. At each time instant, 2 ERSB data blocks may be open for writing, data block A and data block B, which are associated with user space subset A and user space subset B, respectively.

The partitioning can be done in an arbitrary manner or based upon expected or monitored memory access patterns. It may be beneficial that the user utilizes all memory space subsets at the same manner (or at the same quantity)—in order to benefit from the partitioning. The subsets can be of the same size or differ from each other by size. Each subset can include a continuous range or addresses or not. For example—the memory space subsets can include interleaving addresses.

Figure 4:
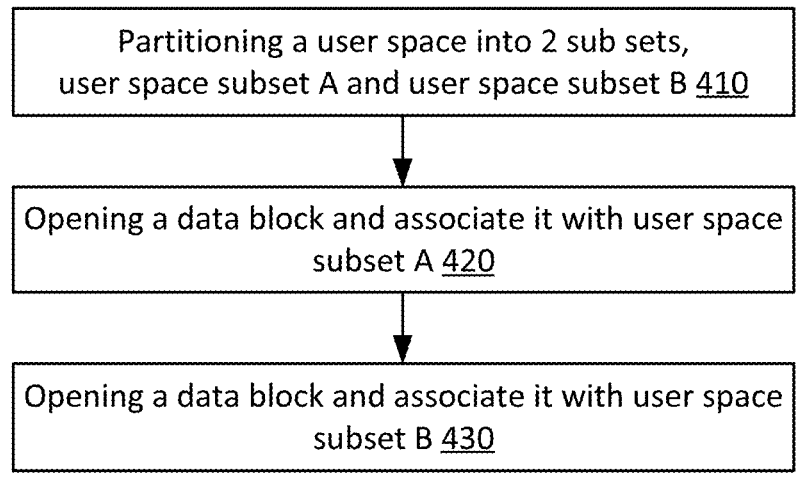
FIG. 4 illustrates a method according to an embodiment of the invention.

FIG. 4 includes a flow chart implementing this procedure. Method 400 of FIG. 4 includes the following stages: Partitioning (410) a user space into 2 subsets—user space subset A and user space subset B; Opening (420) a data block and associate it with user space subset A; and Opening (430) a data block and associate it with user space subset B.

Short random transactions may then be written to the ERSB as follows. Each transaction may be written to the ERSB block corresponding to the user space subset to which the transaction belongs. A transaction destined to an address belonging to set A (respectively B) may be written to ERSB data block A (respectively B). Once an ERSB block associated to some user space subset becomes full, a free ERSB block may be allocated and associated with the said user space subset.

Once the ERSB becomes close to full, i.e. the number of free blocks becomes less than some threshold T, a sequence of block merges may be initiated as follows. The user space subset for which the number of associated ERSB blocks is maximal may be chosen, and all LBAs in that user space subset may then be merged. While the merges are performed, new incoming pages may be written to their corresponding data blocks. The buffer is organized as a collection of 4 KB segments (or pages). Data sectors which arrive from the host are grouped into pages before written to the buffer. Any reference to a "page" can be referred to a reference to a "data sector" and vice verse. The merges may continue until some or all of the ERSB data blocks are emptied. The threshold T may be chosen as some function of f, $N_L$, and $N_p$. This function may be chosen as $$T = \left\lceil \frac{fN_L}{2N_p} \right\rceil + 1.$$

The addition of "+1" is aimed to protect against the following worst case scenario. Assume that just after the number of free blocks becomes smaller than T, one of the remaining blocks is allocated to one of the sets, but all superseding writes are done to the other user space subset. In this case, even though there were T blocks left, one of the blocks is not being used because all the traffic is directed to the other set.

Figure 5:
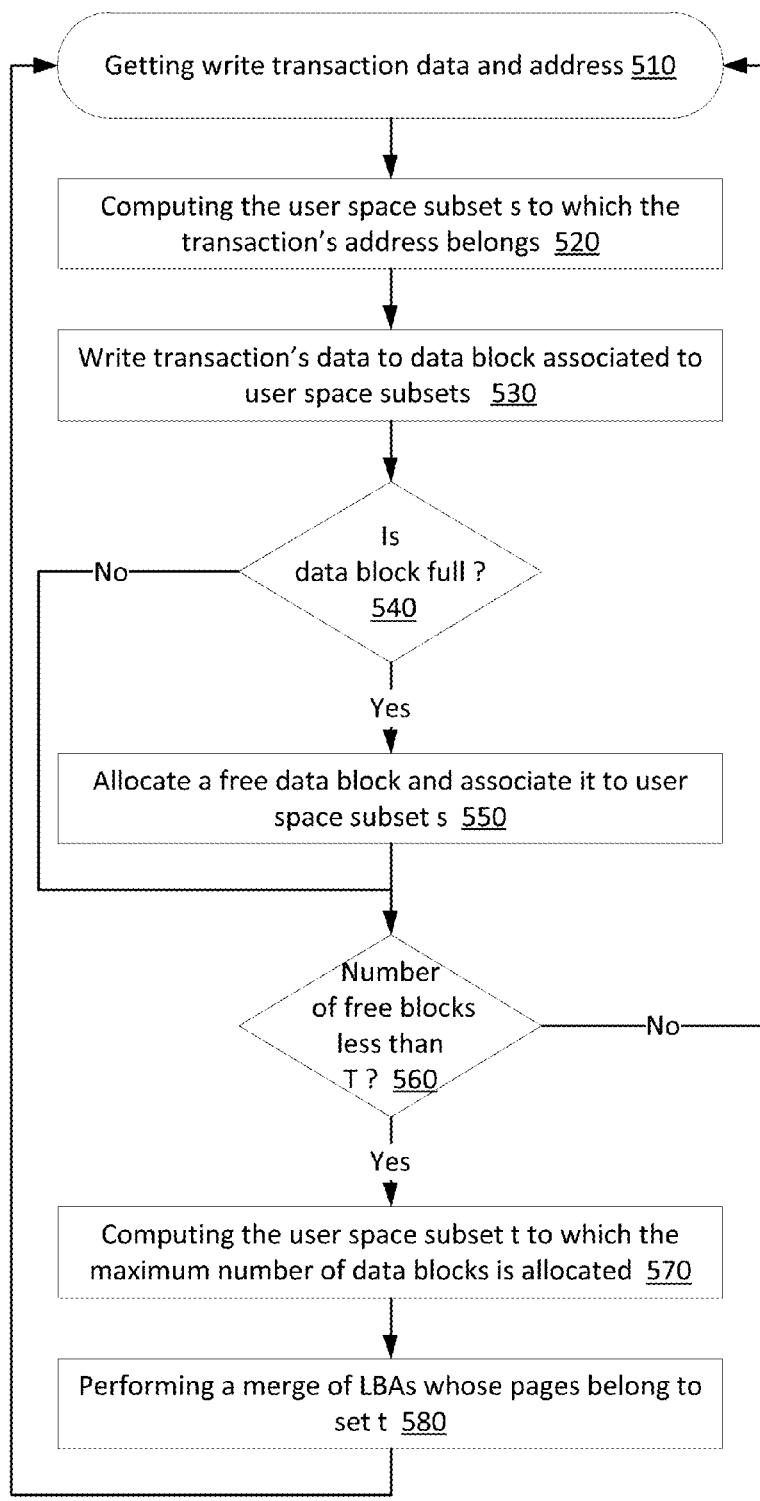
FIG. 5 illustrates a method according to an embodiment of the invention.

FIG. 5 includes a flow chart implementing the above procedure.

For the ERSB system in FIG. 1, the average IOPS performance when performing LBA splitting to 2 user space subsets may approximately be given by Average *IOPS* when splitting user space to 2 sunsets $$IOPS_{SPLIT(2)} = \frac{\frac{2}{3}(N_e - G)N_p}{\frac{2}{3}(N_e - G)N_p t_w + \frac{1}{2}N_L t_m}; G = \left\lceil \frac{fN_L}{2N_p} \right\rceil + 2 \quad \text{Equation 2}$$

Figure 6:
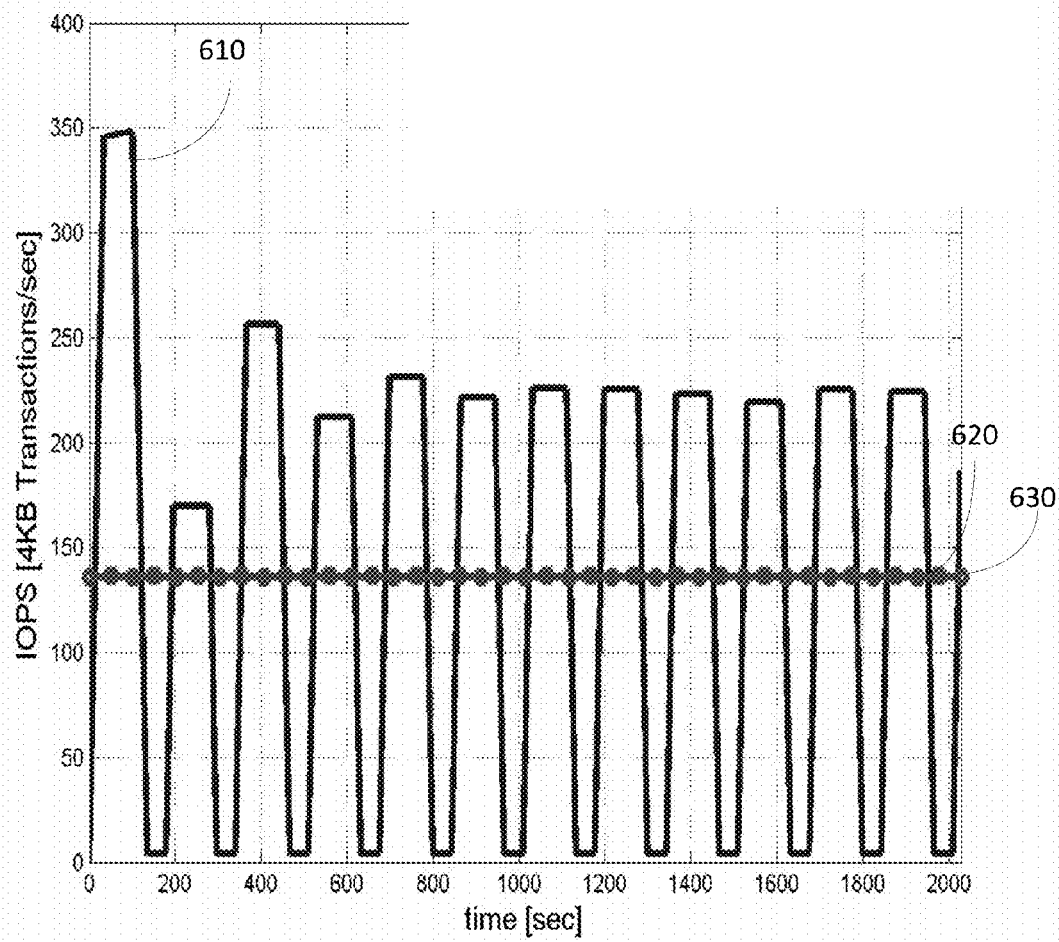
FIG. 6 illustrates the performance of a system according to an embodiment of the invention.

FIG. 6 shows the IOPS performance of a representative ERSB system employing user space splitting to 2 subsets with $N_p=600$, $N_L=240$, $N_e=60$, $f=5$, $t_w=0.001$ [sec], and $t_m=1.2$ [sec]. Instantaneous IOPS (curve 610) are the number of 4 KB pages written to the ERSB per second at each time instant. Theoretical average IOPS (curve 620) are the average number of 4 KB pages written to the ERSB per second as predicted by Equation 2. Empirical average IOPS (curve 630) are the average number of 4 KB pages written to the ERSB per second over the entire time duration as measured in the representative ERSB system.

Splitting the User Space into n User Space Subsets

Another embodiment of the present invention seeks to increases the average IOPS performance of an ERSB system even further by partitioning the user space into n disjoint, equal-sized user space subsets (E.g., subset $A_1$, subset $A_2$, ..., subset $A_n$). At each time instant, n ERSB data blocks may be open for writing, data blocks $A_1$, $A_2$, ..., and $A_n$, which are associated with user space subsets $A_1$, $A_2$, ..., and $A_n$, respectively.

Figure 7:
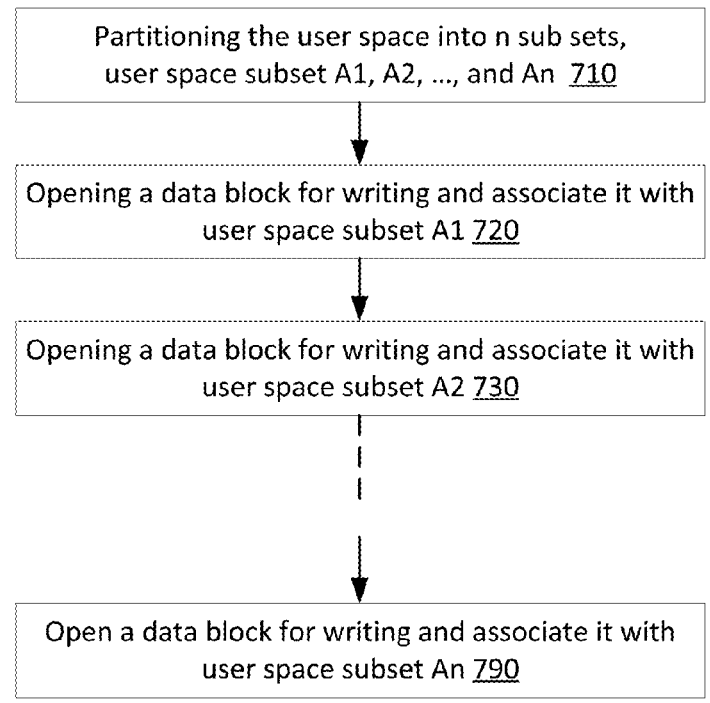
FIG. 7 illustrates a method according to an embodiment of the invention.

FIG. 7 includes a flow chart implementing this procedure. Method 700 of FIG. 7 includes stages 710, 720, 730, and 790.

Stage 710 of partitioning the user space into n sub sets, user space subset A1, A2, ..., and An.

Stage 720 of opening a data block for writing and associate it with user space subset A1.

Stage 730 of opening a data block for writing and associate it with user space subset A2.

Stage 790 of Open a data block for writing and associate it with user space subset An.

Short random transactions may be then written to the ERSB as follows. Each transaction may be written to the ERSB block corresponding to the user space subset to which the transaction belongs. A transaction destined to a logical address belonging to user space subset $A_k$ is written to ERSB data block $A_k$.

Once an ERSB block associated to some user space subset becomes full, a free ERSB block may be allocated and associated with the said user space subset. The data blocks associated with some user space subset (not including the block which is open for writing) are called an ERSB sub pool.

Once the ERSB becomes close to full, i.e. the number of free blocks becomes less than some threshold T, a sequence of block merges may be initiated as follows. The user space subset for which the number of associated ERSB blocks is maximal may be chosen, and all LBAs in that user space subset may then be merged. While the merges are performed, new incoming pages may be written to their corresponding data blocks. The merges may continue until some or all of the ERSB data blocks are emptied. The threshold T may be chosen as some function of f, $N_L$, and $N_p$. This function may be chosen as $$T = \left\lceil \frac{fN_L}{nN_p} \right\rceil + n - 1.$$

The addition of "n−1" is aimed to protect against the following worst case scenario. Assume that just prior to the time when the number of free blocks becomes equal to T, all open ERSB blocks have all pages written in them except perhaps for a single page. At the next page write, one of the blocks may become full and a new block will be allocated to it, rendering the number of free blocks less than T, and causing the merges sequence of the corresponding user space subset to commence. Since n−1 ERSB blocks might cause a new block allocation during the following page writes, we must add these to the gap calculation. FIG. 4 includes a flow chart implementing the above procedure.

For the ERSB system in FIG. 1, the average IOPS performance when performing splitting of the user space into n user space subsets may be approximately given by Average *IOPS* when splitting user space to *n* subsets $$IOPS_{SPLIT(n)} = \frac{\frac{2}{n+1}(N_e - G)N_p}{\frac{2}{n+1}(N_e - G)N_p t_w + \frac{1}{n}N_L t_m}; \quad \text{Equation 3}$$

$$G = \left\lceil \frac{fN_L}{nN_p} \right\rceil + 2(n-1)$$

Equation 3 is explained by considering the steady state behavior of the ERSB system. Specifically, denote by $K_1, K_2, \ldots, K_n$ the number of data blocks allocated to each ERSB sub pool. Next, denote by $N_1, N_2, \ldots, N_n$ the ordering of the sequence $K_1, K_2, \ldots, K_n$ from largest to smallest. Finally, denote by $$a_j = \frac{N_j}{N_e - G}, 1 \le j \le n$$

the fractions of $(N_e - G)$ ERSB blocks allocated to each ERSB sub pool. Whenever the number of free ERSB blocks falls below the threshold, the LBAs belonging to the largest ERSB sub pool are merged, causing the freeing of a fraction $a_1$ of the total $(N_e - G)$ ERSB allocated data blocks. Following the merge, and until the next time that the free block threshold is reached, theses free blocks are evenly distributed among all ERSB sub pools. It follows that whenever the threshold is reached, each fraction is increased by $$\frac{a_1}{n},$$

except for the one which is vacated, and which becomes just $$\frac{a_1}{n}.$$

In other words fractions of *ERSB* blocks in each *ERSB* pool in steady state $$(a_1, a_2, \ldots, a_n) = \left(n\frac{a_1}{n}, (n-1)\frac{a_1}{n}, (n-2)\frac{a_1}{n}, \ldots, \frac{a_1}{n}\right) \quad \text{Equation 4}$$

Finally, summing all terms to unity on the right hand side of Equation 4 yields $$a_1 = \frac{2}{n+1}.$$

It follows that every time the ERSB becomes full, $$\frac{2}{n+1}(N_e - G)$$

data blocks are vacated by merging $$\frac{1}{n}N_L$$

LBAs. In other words, for each $$\frac{2}{n+1}(N_e - G)$$

data blocks which are written, $$\frac{1}{n}N_L$$

LBAs must be merged. This relation implies Equation 3.

Optimizing the Value of n

Figure 8:
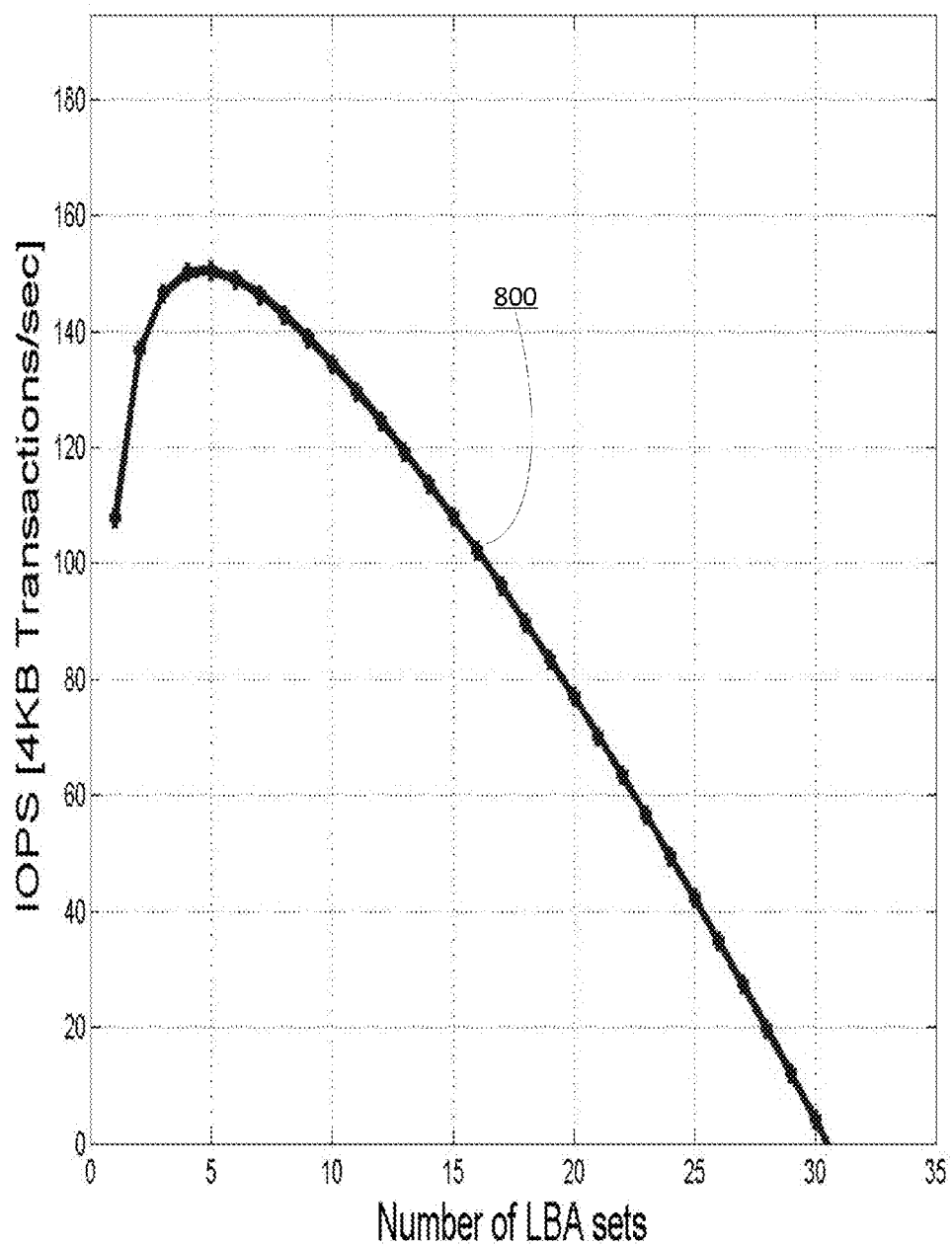
FIG. 8 illustrates the performance of a system according to an embodiment of the invention.

FIG. 8 depicts the IOPS performance of the representative ERSB system (curve 800) employing splitting of the user space into n user space subsets as function of the splitting parameter n with $N_p=600$, $N_L=240$, $N_e=60$, $f=5$, $t_w=0.001$

[sec], and $t_m=1.2$ [sec]. It can be seen that the average IOPS performance grows with n up to a certain point, and then begins to drop. The reason for this behavior is that there are two contradicting factors governing the IOPS expression. The first is the ratio between the amount of data written to the ERSB between two consecutive merge phases and between the time required to merge all the LBAs which belong to the appropriate LBA set, and the second is the amount of gap (G) required to support the ERSB from exhausting all of its free blocks and having nowhere to write incoming data. When n begins to grow, the first term is more dominant, hence the gain which is achieved grows with n. However, as n continues to grow, the second term becomes increasingly more dominant, and the increasing gap reduces the effective size of the ERSB, causing a decrease in IOPS performance. Per a given system and its parameters, it is possible to find numerically the optimal value of n, and optimize the IOPS gain by using this approach. This may be achieved by computing the expression in Equation 3 for all values of $n \leq N_e$ and choosing the value of n for which the result is maximum.

Achieving Increased Average IOPS Performance while Maintaining Constant Instantaneous IOPS Performance by Combining Merging and Cleaning One embodiment of the present invention seeks to increase the average IOPS performance while maintaining a constant instantaneous IOPS performance, by employing a procedure called LBA cleaning and combining it with merging. Cleaning of an LBA in the ERSB may refer to a procedure in which all the pages belonging to the said LBA and residing in one or more data blocks in the ERSB are copied to the currently opened data block in the ERSB and marked as superseded in the data block from which they were copied. In this scheme, all data blocks may contain pages from all LBAs. At each time instant, however, only a single data block may be open for writing. Once a data block is complete (i.e., all of its data pages have been written), a quantity $$X_n = (1-\alpha)\frac{N_L}{N_e}$$

and a quantity $$Y_n = \alpha\frac{N_L}{N_e}$$

may be computed. Then, a quantity $M_n$ of LBAs may be merged and a quantity $C_n$ of LBAs may be cleaned, where $M_n = f(X_n, X_{n-1}, \ldots, X_1)$ and $C_n = g(Y_n, Y_{n-1}, \ldots, Y_1)$.

In one embodiment of the invention, the functions f and g are the same.

In one embodiment of the invention, the functions f and g are the same and $M_n = f(X_n, X_{n-1}, \ldots, X_1)$ is defined as follows. Let $\Psi_0 = 0$. For each $n \geq 1$, $M_n = \lfloor \Psi_{n-1} + X_n \rfloor$ and $\Psi_n = \Psi_{n-1} + X_n - M_n$.

In one embodiment of the invention, LBAs are chosen for merging and cleaning in a round-robin fashion. For example, assume the LBAs in the system are denoted by $LBA_0$, $LBA_1, \ldots, LBA_{N-1}$. Assume further that at some point in time immediately after a data block was complete, the last LBA which had been either merged or cleaned is $LBA_{\pi(x)}$ and that $M_n = m$ and $C_n = c$. Then, $LBA_{\pi((x+1)\%N)}$, $LBA_{\pi((x+2)\%N)}$, ..., $LBA_{\pi((x+m)\%N)}$ may be chosen for merge and $LBA_{\pi((x+m+1)\%N)}$, $LBA_{\pi((x+m+2)\%N)}$, ..., $LBA_{\pi((x+m+c)\%N)}$ may be chosen for cleaning, where $\pi(\cdot)$ is an arbitrary fixed permutation on the logical blocks. If one of the LBAs chosen for cleaning has never been merged since it had last been cleaned, then it is skipped. For example, if $LBA_{\pi((x+m+k)\%N)}$ has never been merged since it had last been cleaned, the LBAs chosen for cleaning may be $LBA_{\pi((x+m+1)\%N)}$, $LBA_{\pi((x+m+2)\%N)}$, ..., $LBA_{\pi((x+m+k-1)\%N)}$, $LBA_{\pi((x+m+k+1)\%N)}$, ..., $LBA_{\pi((x+m+k+2)\%N)}$, ..., $LBA_{\pi((x+m+c+1)\%N)}$.

Figure 9:
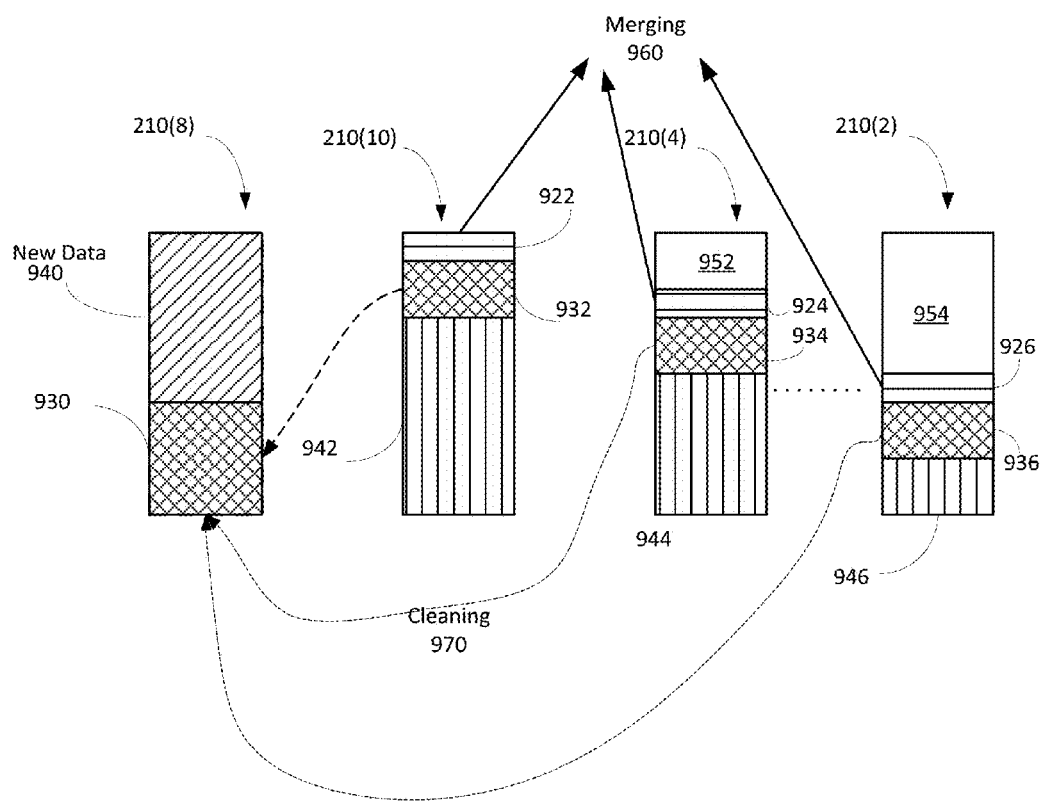
FIG. 9 illustrates cleaning and merging processes according to an embodiment of the invention.

FIG. 9 shows schematically the procedure which may be employed whenever a new data block is opened for writing. Whenever a new data block (210(8)) is opened for writing, some pages (922, 924 and 926) from each completed data block (210(10), 210(4) and 210(2)) are merged (denoted by "merging 960") to their corresponding LBAs, and other pages (932, 934 and 936) are copied during a cleaning process (970) to the new data block. New incoming data 940 is then written to the new data block until it is complete. The data blocks 210(10), 210(4) and 210(2) still maintain data sectors 942, 944 and 946 after the merging and cleaning—and these data sectors can be copied to the new data block in order to empty the data blocks.

Figure 10:
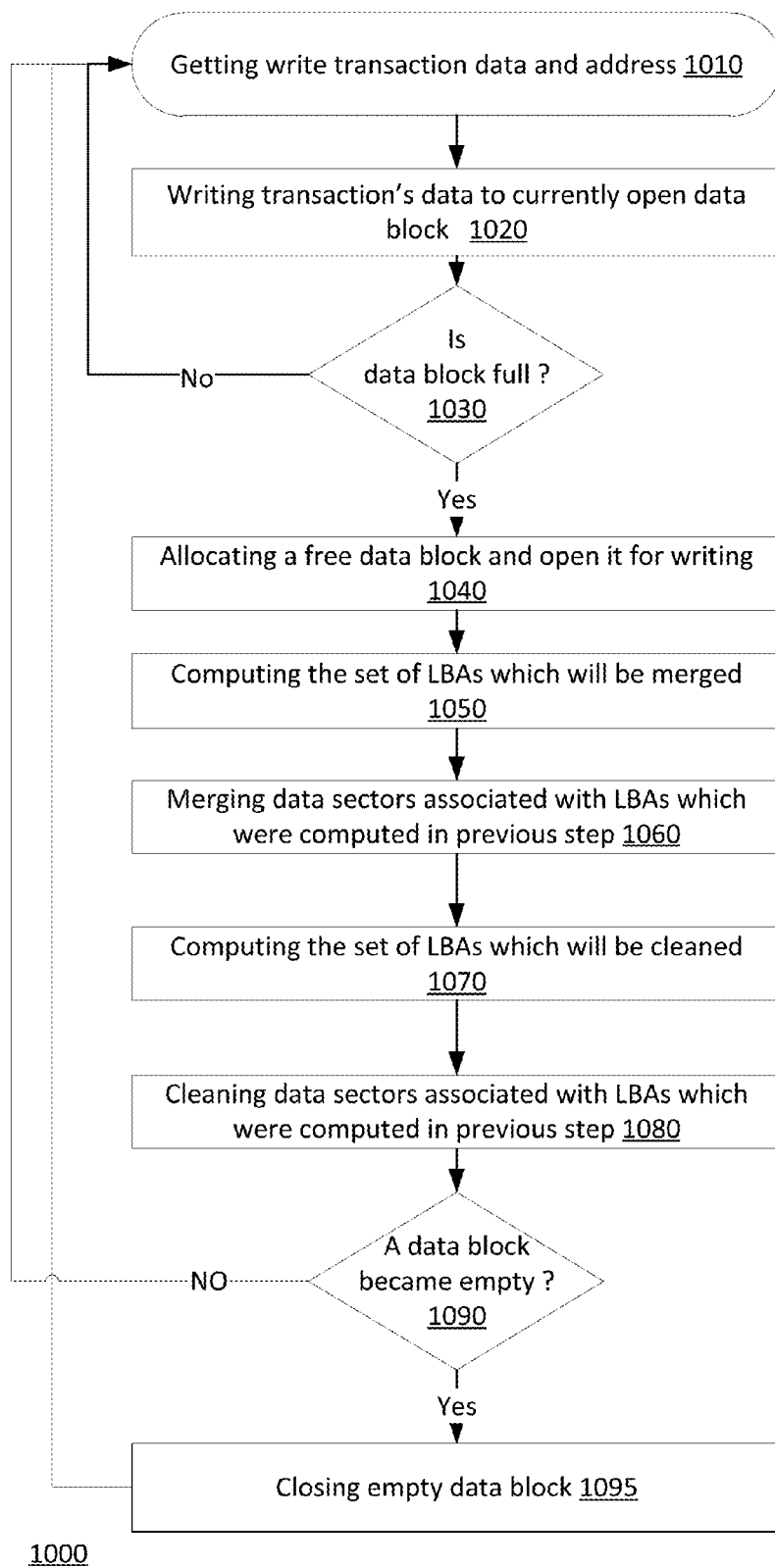
FIG. 10 illustrates a method according to an embodiment of the invention.

FIG. 10 includes a flow chart implementing the above embodiment.

Method 1000 of FIG. 10 may include the following stages:

Stage 1010 of getting write transaction data and address.

Stage 1020 of writing transaction's data to currently open data block.

Stage 1030 of checking if a data block full? if 'No' back to stage 1010.

Stage 1040 of allocating a free data block and open it for writing.

Stage 1050 of computing the set of LBAs which will be merged.

Stage 1060 of merging data sectors associated with LBAs which were computed in previous step.

Stage 1070 of computing the set of LBAs which will be cleaned.

Stage 1080 of cleaning data sectors associated with LBAs which were computed in previous step.

Stage 1090 of checking if a data block became empty? If 'No' back to stage 1010.

Stage 1095 of closing empty data block. Back to stage 1010.

Figure 11:
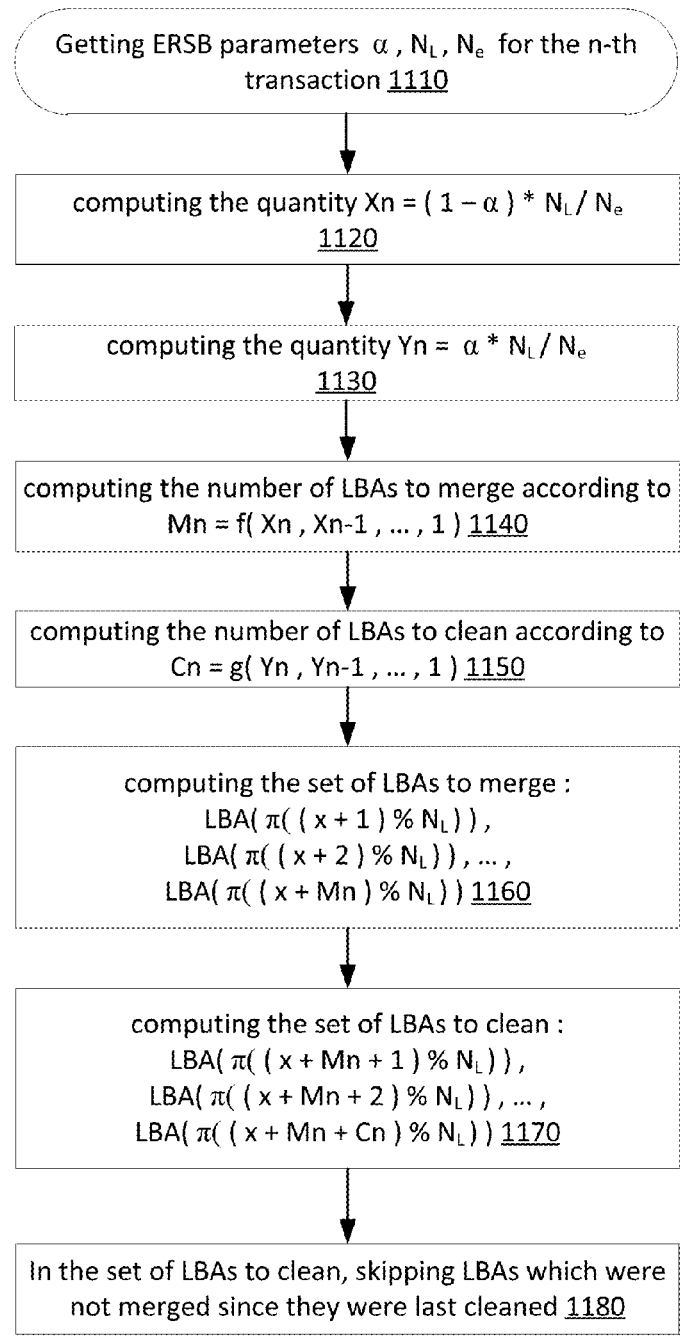
FIG. 11 illustrates a method according to an embodiment of the invention.

FIG. 11 includes a flow chart for computing the set of LBAs which will be merged and the set of LBAs which will be cleaned.

Method 1100 of FIG. 11 may include the following stages:

Stage 1110 of getting ERSB parameters $\alpha$, NL, Ne for the n-th transaction.

Stage 1120 of computing the quantity $Xn=(1-\alpha)*NL/Ne$.

Stage 1130 of computing the quantity $Yn=\alpha*NL/Ne$.

Stage 1140 of computing the number of LBAs to merge according to $Mn=f(Xn, Xn-1, \ldots, 1)$.

Stage 1150 of computing the number of LBAs to clean according to $Cn=g(Yn, Yn-1, \ldots, 1)$.

Stage 1160 of computing the set of LBAs to merge: $LBA(\pi((x+1)\% NL))$, $LBA(\pi((x+2)\% NL))$, ..., $LBA(\pi((x+Mn)\% NL))$.

Stage 1170 of computing the set of LBAs to clean: $LBA(\pi((x+Mn+1)\% NL))$, $LBA(\pi((x+Mn+2)\% NL))$, ..., $LBA(\pi((x+Mn+Cn)\% NL))$.

Stage 1180 of In the set of LBAs to clean, skipping LBAs which were not merged since they were last cleaned.

Figure 12:
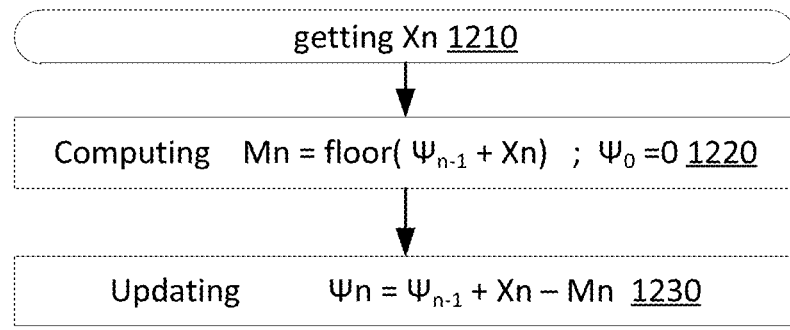
FIG. 12 illustrates a method according to an embodiment of the invention.

FIG. 12 includes a flow chart for implementing a building block required for implementing the flow chart in FIG. 11.

Method 1200 of FIG. 12 may include the following stages:
Stage 1210 of getting Xn.
Stage 1220 of Computing Mn=floor(Ψn−1+Xn); Ψ0=0.
Stage 1230 of Updating Ψn=Ψn−1+Xn−Mn.

For the ERSB system in FIG. 1, the average IOPS performance when combining merging and cleaning may be approximately given by Average IOPS when combining merging and cleaning $$IOPS_{SH-CL} = \frac{\frac{1}{1+\alpha}(N_e - G)N_p}{(N_e - G)N_p t_w + (1-\alpha)N_L t_m}; G = \left\lceil \frac{fN_L}{N_p} \right\rceil \qquad \text{Equation 5}$$

Equation 5 is explained by considering the steady state behavior of the ERSB system employing this embodiment. Denote by x the fraction of the data block which is written with pages from the remaining data blocks during the cleaning process. Since LBAs are chosen in a round robin fashion, and since no LBA is chosen for cleaning unless it has been merged after it had last been cleaned, it follows that at least a fraction of x from all other ERSB data blocks does not contain any pages from the LBAs currently chosen for cleaning. Therefore, $$\alpha \frac{N_p}{N_e}(1-x)$$

pages are copied from each ERSB data block to the new data block. Equating the number of cleaned pages in the new data block $xN_p$ to the aggregate number of pages copied from all ERSB data blocks yields the relation $$x = \frac{\alpha}{1+\alpha}$$

Finally, the IOPS may be given by considering the number of newly written pages $(1-x)N_p$, and the time required for writing these pages. This time includes writing the entire data block plus the time needed for LBA merge. By substituting α into the resulting expression Equation 5 is obtained.

Figure 13:
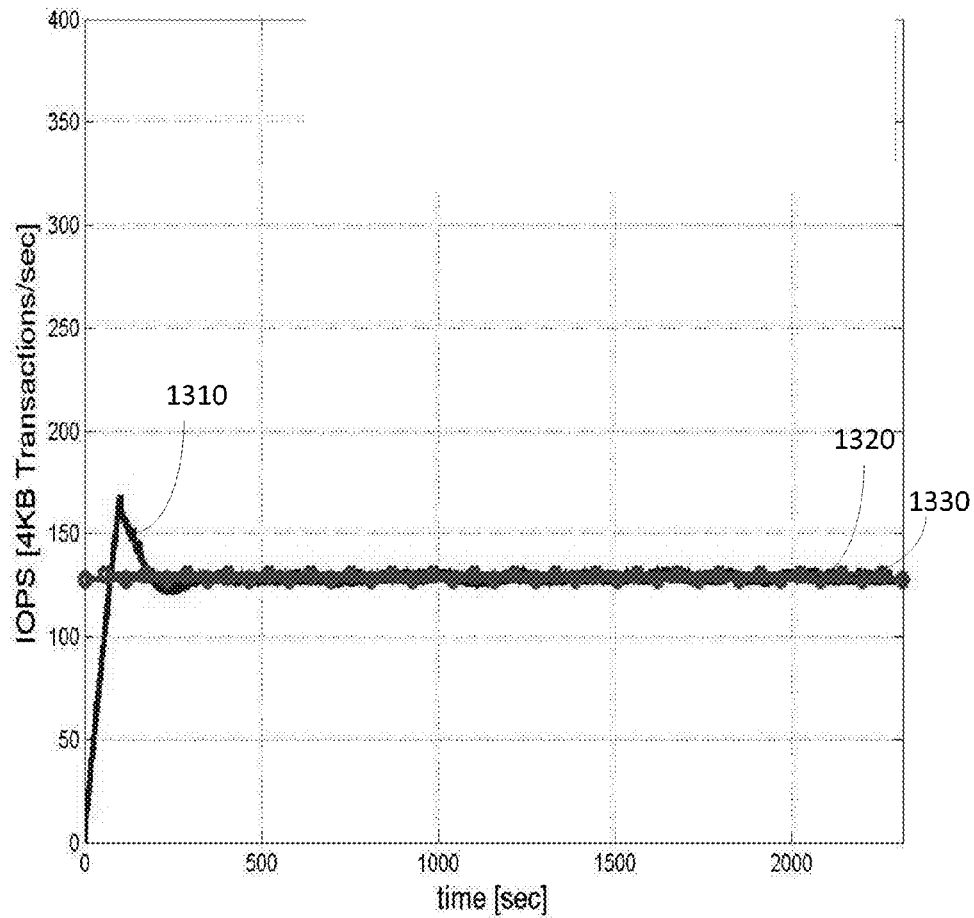
FIG. 13 illustrates the performance of a system according to an embodiment of the invention.

FIG. 13 depicts the IOPS performance (curve 1310) of the representative ERSB system employing combining merging and cleaning according to a certain embodiment of the invention with $N_p$=600, $N_L$=240, $N_e$=60, f=5, $t_w$=0.001 [sec], $t_m$=1.2 [sec], and α=0.5. The a men of skill in the art may observe the gain of this scheme w.r.t. prior art in terms of increased average IOPS performance and constant instantaneous IOPS performance. FIG. 13 also illustrates theoretical average IOPS (curve 1320) and empirical average IOPS (curve 1330).

In one embodiment of the present invention, the LBAs are chosen for merge according to the number of pages from each LBA which reside in the ERSB and/or the time which passed since the first page of each LBA entered the ERSB. For example, LBAs which have more pages in the ERSB and which reside in the ERSB for a longer period of time are merged sooner than others.

In one embodiment of the present invention, LBAs are chosen for cleaning according to the number of pages from each LBA which reside in the ERSB and on the time which passed since the first page of each LBA entered the ERSB.

In one embodiment of the invention, LBAs are chosen for cleaning according to their previous merge/clean history. For example, an LBA may not be chosen for cleaning if it had been chosen for cleaning for more than K times consecutively without being chosen for merge.

An additional element which can generalized the above merge-clean process may include both the LBA merge and LBA cleaning as mentioned above, but also ERSB data block copy. The idea is that a certain portion of LBAs is merged, another portion of LBA is cleaned, and then we are left with a number of data segments still lying in the ERSB data block that are copied to the new location, where the cleaned LBAs reside. By optimizing the ratios between the LBAs that are merged and cleaned we can further optimize performance.

Achieving Increased Average IOPS Performance while Maintaining Constant Instantaneous IOPS Performance by Partitioning the ERSB to a Plurality of ERSBs Another embodiment of the present invention seeks to achieve an increased average IOPS performance while maintaining constant instantaneous IOPS performance. In one embodiment of the invention, the ERSB blocks are divided among J mini ERSBs (MERSBs) comprising each K data blocks (e.g., K=3). The entire user space may be divided among the J MERSBs, and in each MERSB, the allotted user space may further be divided into L (e.g., 2) LBA sets. Each MERSB may be managed by LBA splitting as is described above.

In one embodiment of the invention, in each MERSB, at each time instant, there may be two data blocks open for writing, corresponding to two user space subsets dividing the user space allotted to the said MERSB. When one of the data blocks which belongs to a first user space subset becomes full, the third data block is allocated to the same user space subset and further writes to this user space subset resume to this data block. Next, if the newly allocated data block becomes full, or if the data block of the second user space subset becomes full, merges of all LBAs corresponding to the user space subset already occupying two data blocks may then be performed causing two data blocks to be freed.

Figure 14:
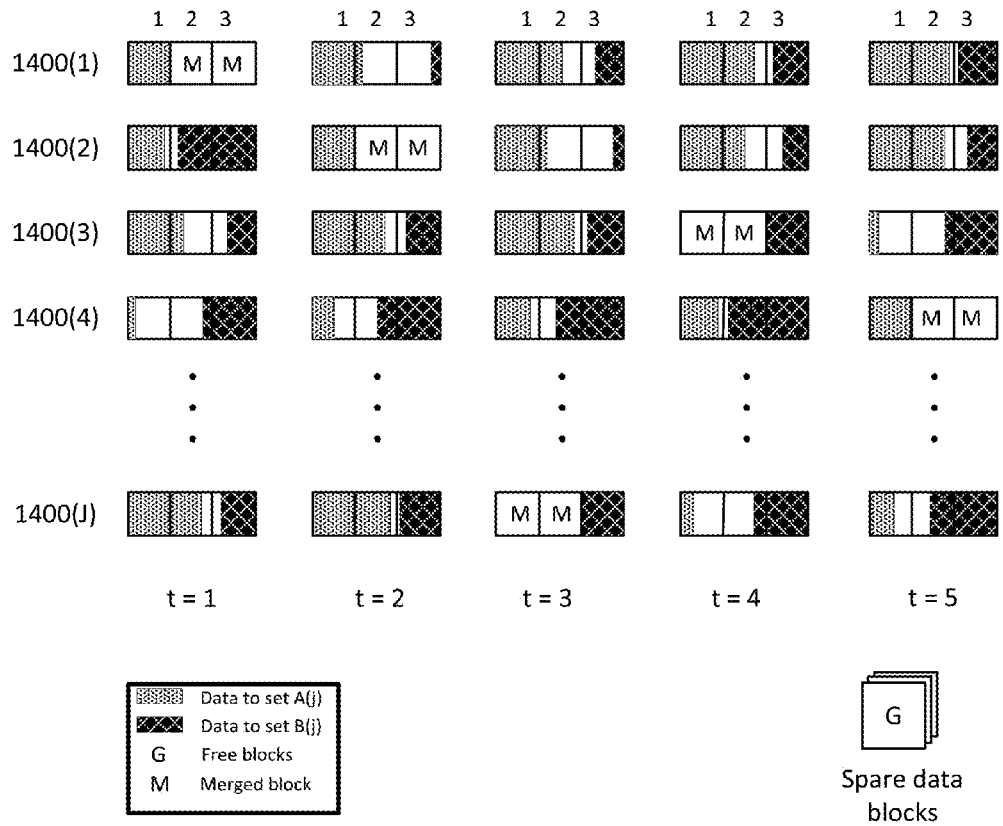
FIG. 14 illustrates various data blocks at various points of time and a multiple sub-buffers according to an embodiment of the invention.

FIG. 14 schematically shows this embodiment. Each column represents the fullness state of each data block in each of the MERSBs at some time instant. For example, MERSB 2 at time instant 1 has one data block open for writing allocated for user space subset A(2) and two data blocks (one open for writing and the other complete) allocated for user space subset B(2). Of the two data blocks allocated to user space subset B(2), one data block is complete and closed and the other is open for writing. At time instant 1, the two open data blocks have little space left in them. At time instant 2, the data block allocated to user space subset A(2) become full. At this point, the LBAs belonging to user space subset B(2) are merged, and a new data block is allocated to user space subset B(2). At time instant 3, the data block allocated to user space subset A(2) become full, and another data block is allocated to this user space subset.

In one embodiment of the present invention, the write pointers of the open data blocks are randomized at the beginning of life in order to spread the merge times as much as possible. In other embodiments, other forms of synchronization between the MERSBS may be employed to spread the merge events across time.

FIG. 14 depicts the IOPS performance of the representative ERSB system employing partitioning of the ERSB to a plurality of ERSBs with $N_p$=600, $N_L$=240, $N_e$=60, f=5, $t_w$=0.001 [sec], $t_m$=1.2 [sec], K=3, and J=18. The a men of skill in the art may observe the gain of this scheme w.r.t. prior art in terms of increased average IOPS performance and constant instantaneous IOPS performance.

Figure 15:
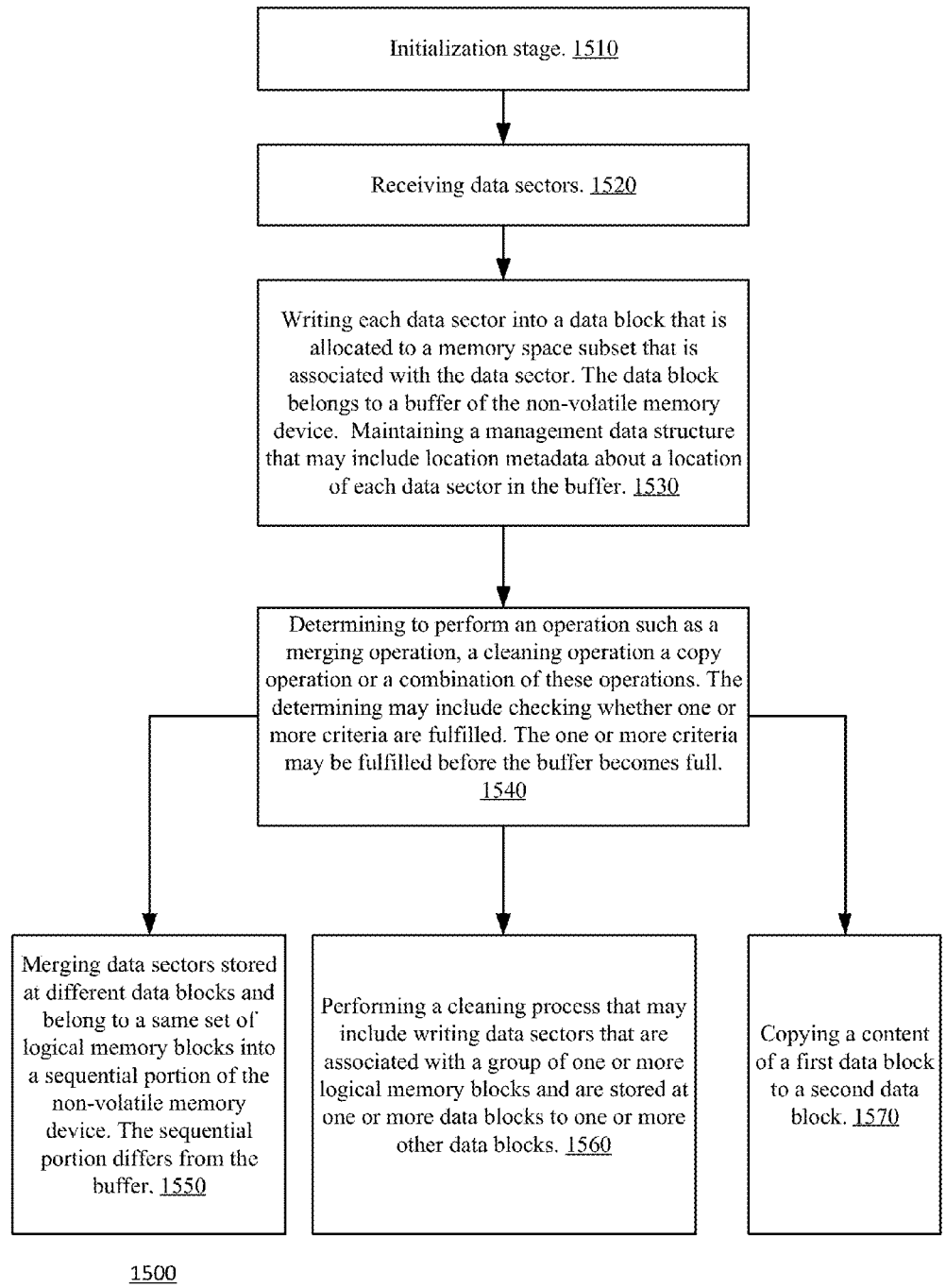
FIG. 15 illustrates a method according to an embodiment of the invention.

FIG. 15 illustrates method 1500 according to an embodiment of the invention.

Method 1500 may start by initialization stage 1510. Stage 1510 may include determining the number (n) of memory space subsets, determining the size of each memory space subset, partitioning the memory space to multiple memory space subsets and the like.

Stage 1510 may include at least one of the following stages:

i. Allocating data blocks to the multiple memory space subsets while maintaining at least one non-full data block to each memory space subset.

ii. Partitioning a memory space to the multiple memory space subsets.

iii. Partitioning the memory space to uneven sized memory space subsets.

iv. Partitioning the memory space to evenly sized memory space subsets.

v. Determining a number (n) of the multiple memory space subsets.

vi. Determining n in response to at least one out of: (a) an aggregate amount of data sectors received between consecutive merging operations; (b) a time required to write to the sequential portion all data blocks stored in the buffer, and (c) an amount of gap required to prevent a loss of data sectors due to a temporary absence of data blocks ready to receive new data sectors.

vii. Computing, for each suggested number of memory space subsets out of multiple suggested numbers, a quantity in response to: (a) a number of transaction timeout durations required to perform a merge of a logical memory block; (b) an instantaneous number of logical memory blocks which have at least one associated data sectors in the buffer; (c) a number of data sectors in a data block of the buffer; (d) the suggested number of memory space subsets; (e) a time duration for writing a data sector; (f) a number of data blocks in the buffer, and (g) a time duration for performing a merge of a logical memory block; and selecting, out of the multiple suggested numbers of memory space subsets, a number that yields a highest value quantity.

viii. Partitioning the memory space so that each memory space subset may include an integral number of logical memory blocks.

Stage 1510 may be followed by stage 1520 of receiving data sectors. Each data sector belongs to a memory space subset out of multiple memory space subsets. The multiple memory space subsets comprise a plurality of logical memory blocks.

Stage 1520 may be followed by stage 1530 of writing each data sector into a data block that is allocated to a memory space subset that is associated with the data sector. The data block belongs to a buffer of the non-volatile memory module.

Stage 1530 may also include maintaining a management data structure that may include location metadata about a location of each data sector in the buffer.

Stage 1530 may be followed by stage 1540 of determining to perform an operation such as a merging operation, a cleaning operation a copy operation or a combination of these operations. The determining may include checking whether one or more criteria are fulfilled. The one or more criteria may be fulfilled before the buffer becomes full.

A criterion may be fulfilled when a number of free data blocks of the buffer falls below a predetermined threshold. A non-limiting example of such a predetermined threshold is T. T may be regarded as a minimal value of free data blocks that can still facilitate merging without loss of data sectors.

Stage 1510 may include receiving the predetermined threshold or determining the predetermined threshold. The predetermined threshold can be determined in response to: (a) a number of transaction timeout durations required to perform a merge of data sectors that belong to a certain logical memory block; (b) an instantaneous number of logical memory blocks which have at least one associated data sector in the buffer; (c) a number of memory sectors in a data block of the buffer, and (d) a number of memory space subsets.

If it is determined to perform a merge operation then stage 1540 may be followed by stage 1550 of merging data sectors stored at different data blocks and belong to a same set of logical memory blocks into a sequential portion of the non-volatile memory module. The sequential portion differs from the buffer.

Stage 1540 may include selecting at least one logical memory block from the set of logical memory blocks (to be merged).

Stage 1540 may include selecting the set so that the set may include at least one logical memory blocks that is associated with a maximum amount of data blocks.

Stage 1540 may include selecting the set by determining a permutation transformation on a set of logical block indices; selecting a set of indices; and computing the logical block indices by employing the permutation on the set of indices.

Stage 1550 may include merging of the data sectors into the sequential portion by: merging data sectors into a plurality of erase block sections of data; writing the plurality of erase block sections of data to a plurality of erase blocks of the sequential portion; and creating for each data sector a pointer in the data management structure, the pointer corresponds to an associated logical address and to a location of an erase block in which the data sector is stored.

If it is determined to perform a cleaning operation then stage 1540 may be followed by stage 1560 of performing a cleaning process that may include writing data sectors that are associated with a group of one or more logical memory blocks and are stored at one or more data blocks to one or more other data blocks.

Stage 1560 may include determining the logical data blocks that should be cleaned. The determining may include at least one out of:

i. Computing a quantity in response to (a) an instantaneous number of logical memory blocks which have at least one associated data sector in the buffer; (b) a number of data blocks in the buffer, and (c) a predefined constant; computing, based on said quantity and on at least one previously computed quantities, an integer number of logical memory blocks to be cleaned. This may also include selecting, based on said number of logical data blocks to be cleaned, the one or more other data blocks.

ii. Determining a permutation transformation on a set of logical memory block indices; selecting a set of indices; and computing logical memory block indices by employing the permutation on the set of indices.

iii. Selecting of a contiguous set of integers starting from a next index after an index which was last used for either merging or cleaning iv. Selecting of a contiguous set of integers starting from the next index after the index which was last used for either merging or cleaning, wherein indices which correspond to logical block indices which were never merged since they were last cleaned are omitted.

Stage 1560 may include updating pointers associated with the data sectors to reflect the cleaning process.

If it is determined to perform a copying operation then stage 1540 may be followed by stage 1570 of copying a content of a first data block to a second data block. The copying may be executed in response to a fullness level of the first data block—in order to assist in emptying the first data block. Referring to the example set forth in FIG. 9—copying data sector 946 from data block 210(2) to new data block 210(8) can empty data block 210(2).

Figure 16:
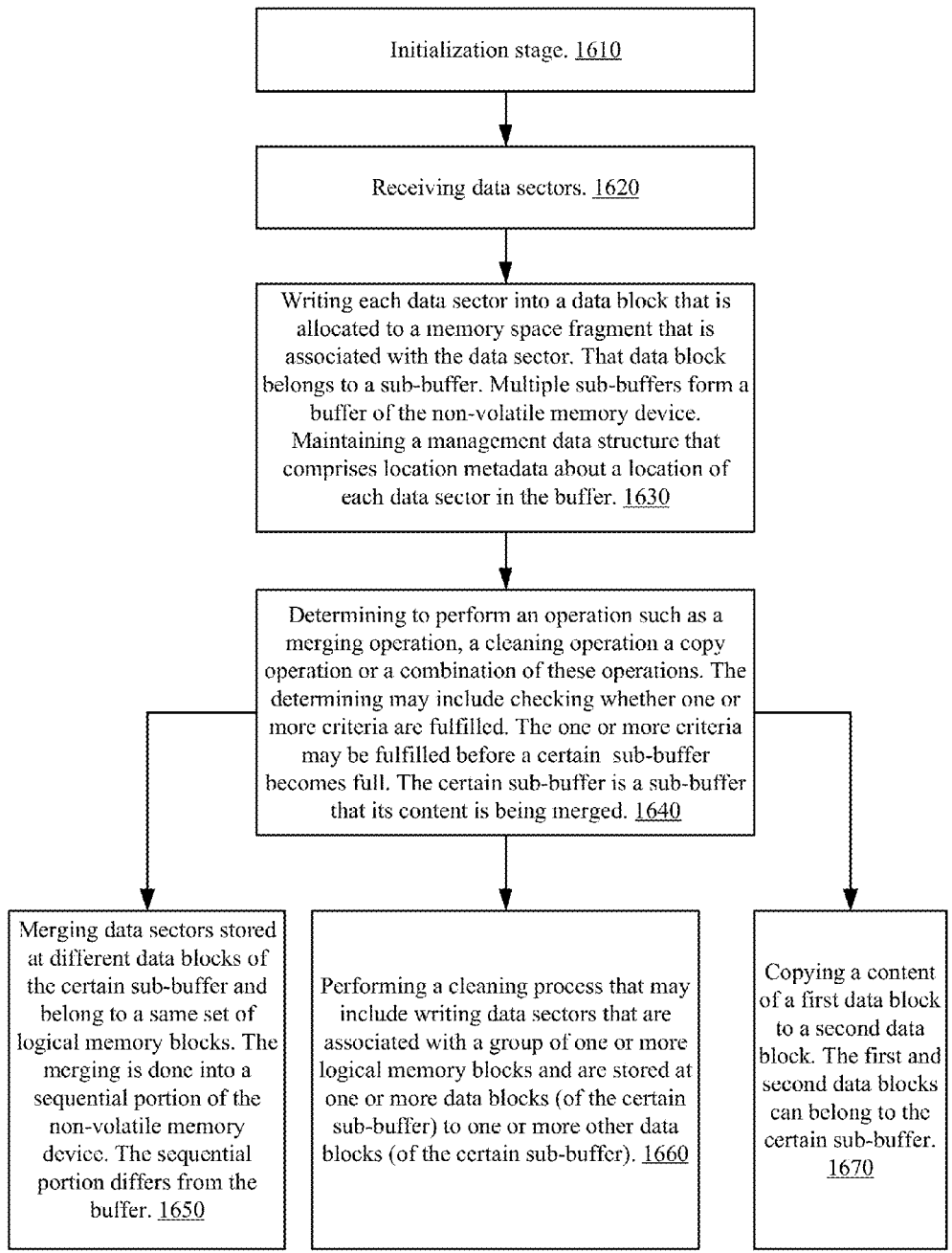
FIG. 16 illustrates a method according to an embodiment of the invention.

FIG. 16 illustrates method 1600 according to an embodiment of the invention.

Method 1600 differs from method 1500 by performing further partitions of the memory space subsets to memory space fragments, by partitioning the buffer to sub-buffers and by performing decisions based upon the state of the sub-buffers. For convenience of explanation the major differences between the two methods are illustrated below. Any stage of method 1500 can be included within method 1600 while applying the required changes.

Method 1600 may start by initialization stage 1610. Stage 1610 may include determining the number (n) of memory space subsets, determining the number of memory space fragments (larger than n), determining the size of each memory space subset, determining the size of each memory space fragment, partitioning the memory space to multiple memory space subsets and partitioning each memory space subset to multiple memory space fragments, and the like. FIG. 14 illustrates multiple data blocks that belong to multiple sub-buffers, each data block is allocated to a memory space fragment.

Stage 1610 may be followed by stage 1620 of receiving data sectors. Each data sector belongs to a memory space fragment.

Stage 1620 may be followed by stage 1630 of writing each data sector into a data block that is allocated to a memory space fragment that is associated with the data sector. That data block belongs to a sub-buffer. Multiple sub-buffers form a buffer of the non-volatile memory module. Stage 1630 may also include maintaining a management data structure that comprises location metadata about a location of each data sector in the buffer.

Stage 1630 may be followed by stage 1640 of determining to perform an operation such as a merging operation, a cleaning operation a copy operation or a combination of these operations. The determining may include checking whether one or more criteria are fulfilled. The one or more criteria may be fulfilled before a certain sub-buffer becomes full. The certain sub-buffer is a sub-buffer that its content is being merged.

If it is determined to perform a merge operation then stage 1640 may be followed by stage 1650 of merging data sectors stored at different data blocks of the certain sub-buffer and belong to a same set of logical memory blocks. The merging is done into a sequential portion of the non-volatile memory module. The sequential portion differs from the sub-buffer.

If it is determined to perform a cleaning operation then stage 1640 may be followed by stage 1660 of performing a cleaning process that may include writing data sectors that are associated with a group of one or more logical memory blocks and are stored at one or more data blocks (of the certain sub-buffer) to one or more other data blocks (of the certain sub-buffer).

If it is determined to perform a copying operation then stage 1640 may be followed by stage 1670 of copying a content of a first data block to a second data block. The first and second data blocks can belong to the certain sub-buffer.

FIG. 2 depicts an ERSB system characterized by the following parameters:

$N_L$—Number of logical blocks (LBAs)
$\overline{N}_L$—Instantaneous number of logical blocks (LBAs)
$N_e$—Number of ERSB data blocks
$N_{P_L}$—Number of (4 KB) pages (segments) in a logical block
$n_E$—Number of (4 KB) pages (segments) in an ERSB data block
f—Number of merge fragments (or transaction timeout durations) required to complete a block merge
$t_w$—Page write duration [sec]
$t_m$—Merge duration [sec]
g—Safety gap [pages]

$$\overline{t_m} = \frac{\overline{N}_L \cdot t_m}{n_E \cdot N_e - g} \text{ Normalized merge duration [Sec]}$$

For the ERSB system in FIG. 1, the average IOPS performance is given by:

Average *IOPS* when using prior art ERSB $$IOPS = \frac{(n_E \cdot N_e - g)}{(n_E \cdot N_e - g) \cdot t_w + N_L \cdot t_m} = \frac{1}{t_w + \overline{t_m}} \quad \text{Equation 6}$$

Figure 17:
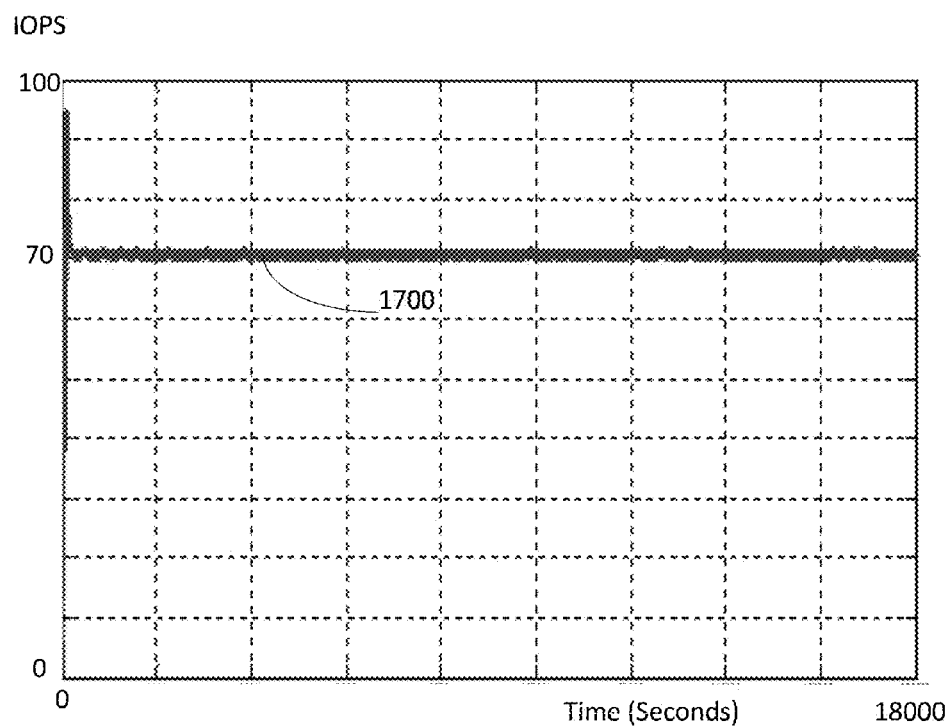
FIG. 17 illustrates the performance of a system according to an embodiment of the invention.

FIG. 17 shows the IOPS performance (curve 1700) of a representative ERSB system employing a management scheme with $N_p$=4096, $N_L$=1795, $n_E$=1376, $N_e$=132, f=19, $t_w$=5.6 [uSec], and $t_m$=1.366 [sec]. Instantaneous IOPS are the number of 4 KB pages written to the ERSB per second at each time instant (averaged over a 100 sec time window). Theoretical average IOPS are the average number of 4 KB pages written to the ERSB per second as predicted by Equation 1. Empirical average IOPS are the average number of 4 KB pages written to the ERSB per second over the entire time duration as measured in the representative ERSB system.

According to an embodiment of the invention there can be provided a method in which the number of merged memory space portions can exceed the number of cleaned memory space portions. The number of cleaning operations can exceed the number of merge operations.

Figure 18:
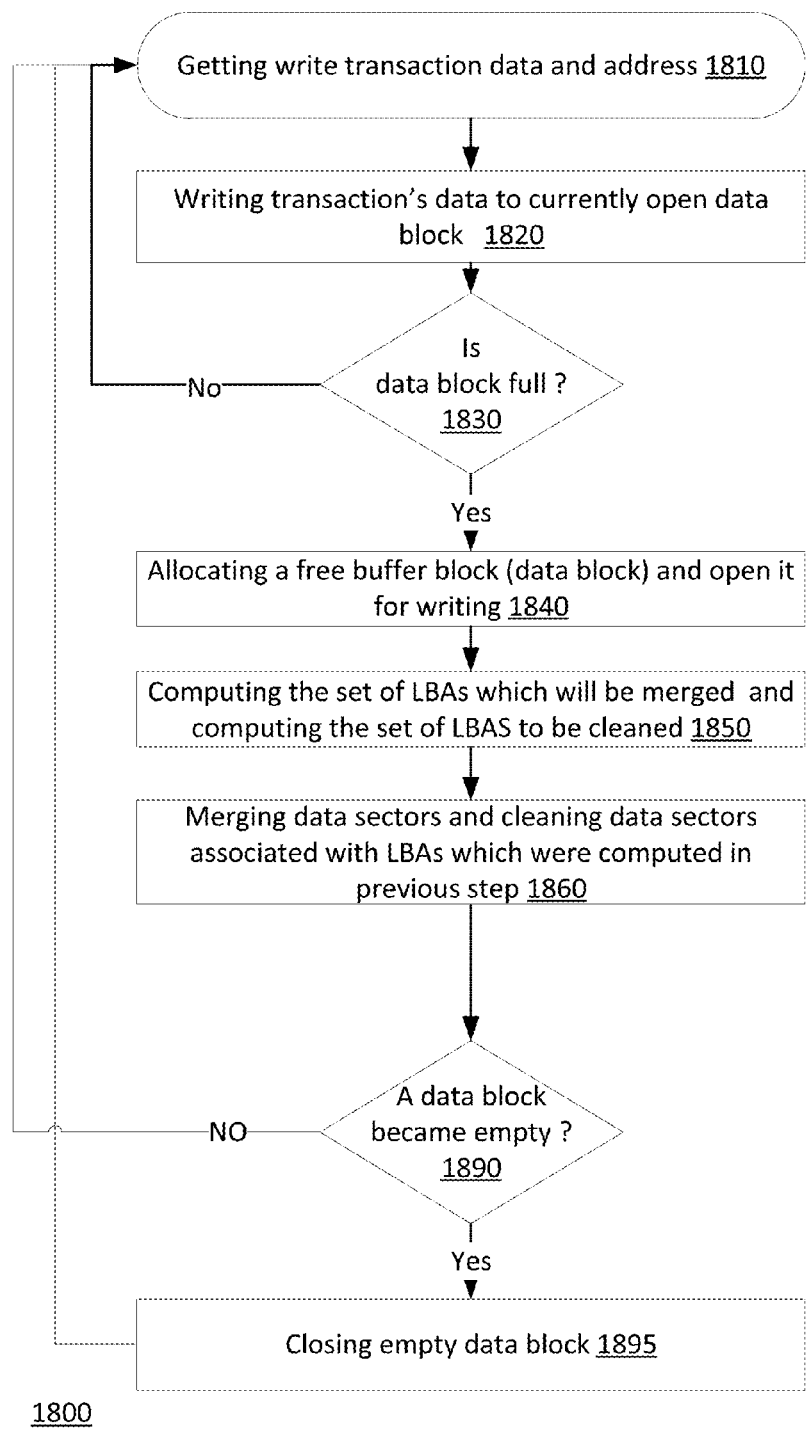
FIG. 18 illustrates a method according to an embodiment of the invention.

FIG. 18 illustrates a method 1800 according to an embodiment of the invention.

Method 1800 of FIG. 18 may include the following stages:

Stage 1810 of getting write transaction data and address.

Stage 1820 of writing transaction's data to currently open data block.

Stage 1830 of checking if a data block full? if 'No' back to stage 1810.

Stage 1840 of allocating a free data block and open it for writing.

Stage 1850 of computing the set of LBAs which will be merged and computing the set of LBAs which will be cleaned.

Stage 1860 of merging data sectors cleaning data sectors associated with LBAs associated with LBAs which were destined to be merged and cleaned respectively during stage 1850.

Stage 1890 of checking if a data block became empty? If 'No' back to stage 1810. If 'yes' closing empty data block in stage 1895 and jumping back to stage 1810.

The merging and cleaning operations may be executed in fragments and the method may include calculating inter-fragment threshold that may indicate how many data segments should e received between consecutive fragments. The calculation can be executed one or multiple times and may allow to adjust the merging and cleaning processes to the state of the buffer.

Figure 19:
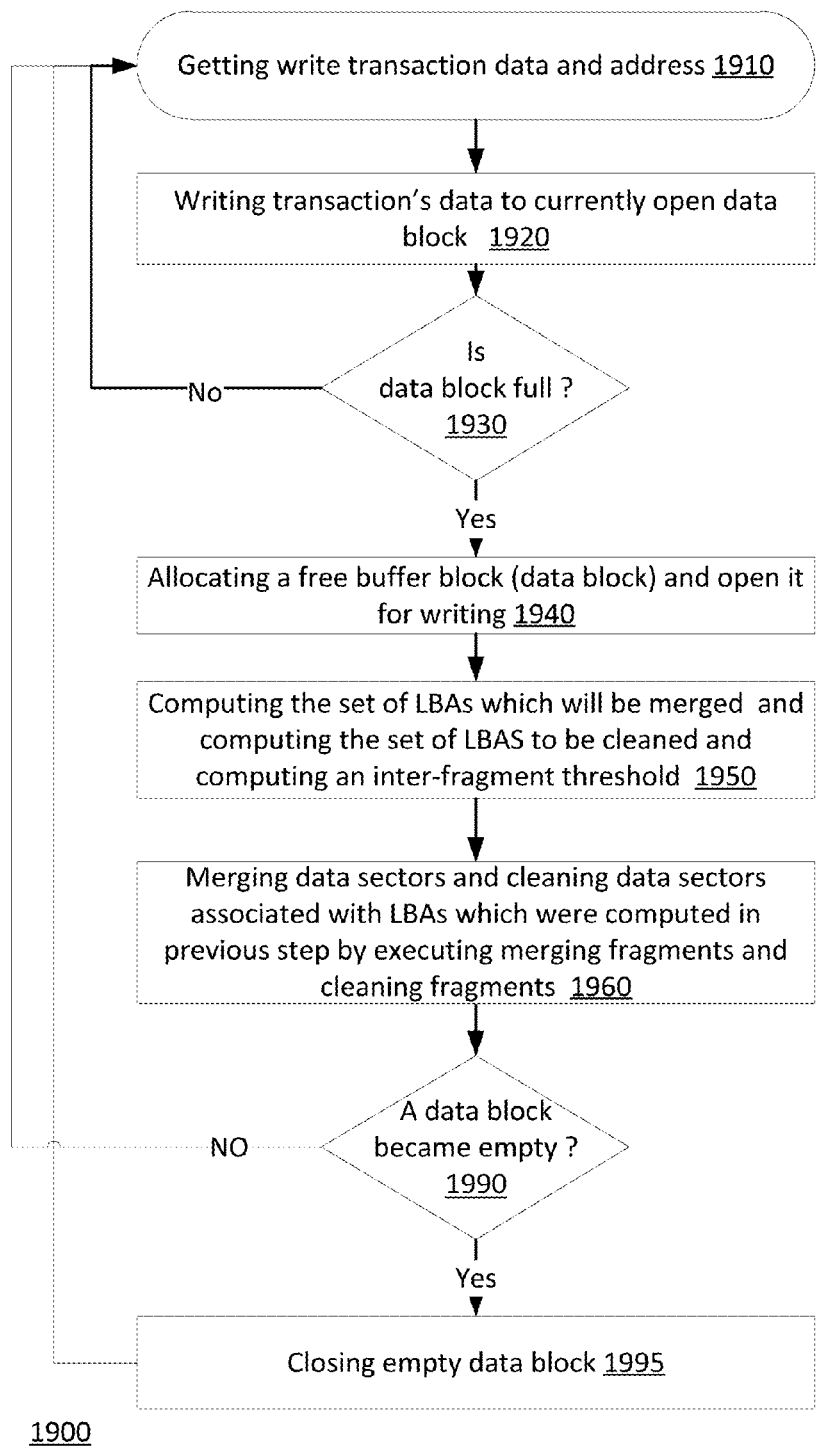
FIG. 19 illustrates a method according to an embodiment of the invention.

FIG. 19 illustrates a method 1900 according to an embodiment of the invention.

Method 1900 of FIG. 19 may include the following stages:

Stage 1910 of getting write transaction data and address.

Stage 1920 of writing transaction's data to currently open data block.

Stage 1930 of checking if a data block full? if 'No' back to stage 1910.

Stage 1940 of allocating a free data block and open it for writing.

Stage 1950 of computing the set of LBAs which will be merged and computing the set of LBAs which will be cleaned. Stage 1950 may also include calculating the inter-fragment threshold.

Stage 1960 of merging data sectors cleaning data sectors associated with LBAs associated with LBAs which were destined to be merged and cleaned respectively during stage 1950. The merging and the cleaning may be executed in fragments. The fragments may be spaced apart from each other by the inter-fragment threshold.

Stage 1990 of checking if a data block became empty? If 'No' back to stage 1910. If 'yes' closing empty data block in stage 1995 and jumping back to stage 1910.

Figure 20:
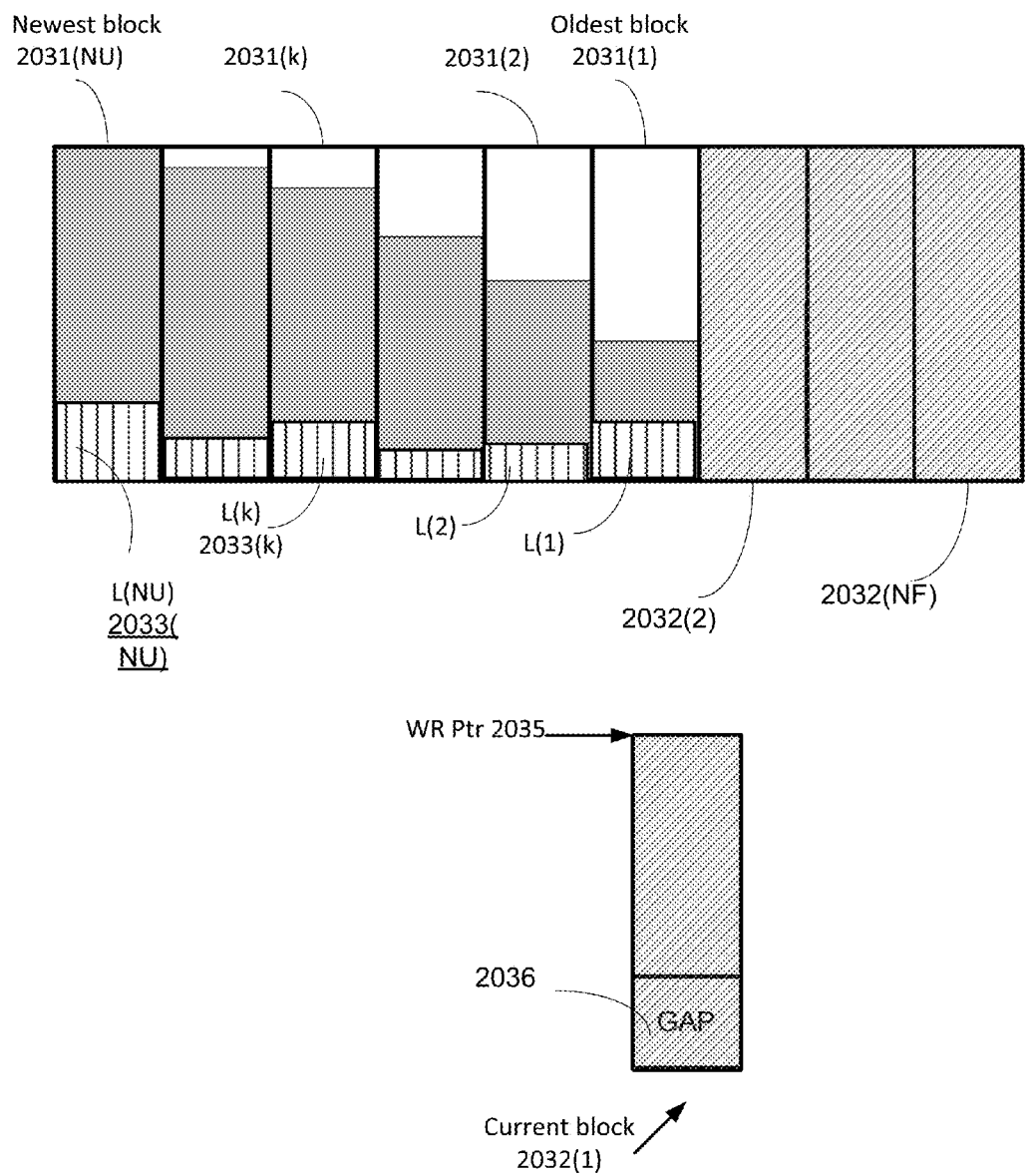
FIG. 20 illustrates a state of a buffer according to an embodiment of the invention.

FIG. 20 shows the state of the buffer 210 after some data sectors were written to it according to an embodiment of the invention. The data sectors are written to the buffer in a sequential manner—filling one buffer block after the other.

FIG. 20 illustrates two types of buffer blocks—empty buffer blocks 2032(1)-2032(NF) and non-empty buffer blocks 2031(1)-2031(NU) which are ordered according to their age—2031(1) being the oldest—it stores the data sectors that has the earliest writing time out of all the data sectors currently buffered in the buffer.

A non-empty buffer blocks stores at least one valid data page and possibly have one or more superseded pages. The empty buffer blocks may also be referred to as unused or free.

It is noted that buffer blocks 210(1)-210(Ne) are the same buffer blocks as those illustrated in FIG. 20 (2032(1)-2032(NF) and 2031(1)-2031(NU)) and that the difference reference numbers provided in FIG. 2 reflect a separation of the data blocks to empty and non-empty buffer blocks.

FIG. 20 also illustrates an empty buffer block 2032(1) that is referred to as a current buffer block as it is the buffer block that should receive the next received data sectors. WR Ptr 2035 is a pointer which may be used to point to the next available empty page in the newly allocated buffer block. The current buffer block also include a residual buffer space (GAP 2036) that is allocated for receiving data sectors during an execution of the merging.

The indices 1, 2, . . . , NU of non-empty buffer blocks 2031(1)-2031(NU) may reference the used buffer blocks according to their age, i.e. for j=1, 2, . . . , NU−1, buffer block j was written prior to buffer blocks j+1, j+2, . . . , NU. Each buffer block may have pages from one or more memory space portions.

A memory space portion is said to be a primary memory space portion of some buffer block if the first page written to the buffer from said memory space portion was written to said buffer block. The number of primary memory space portions of each of the used buffer blocks is denoted by L(k), wherein index k ranges between 1 and NU. For example, L(NU), L(k), L(2) and L(1) are denoted 2033(NU), 2033(k), 2033(2) and 2033(1) respectively.

NF=NE−NU is the number of free buffer blocks which do not contain any valid data including the current buffer block which may contain valid data.

Figure 21:
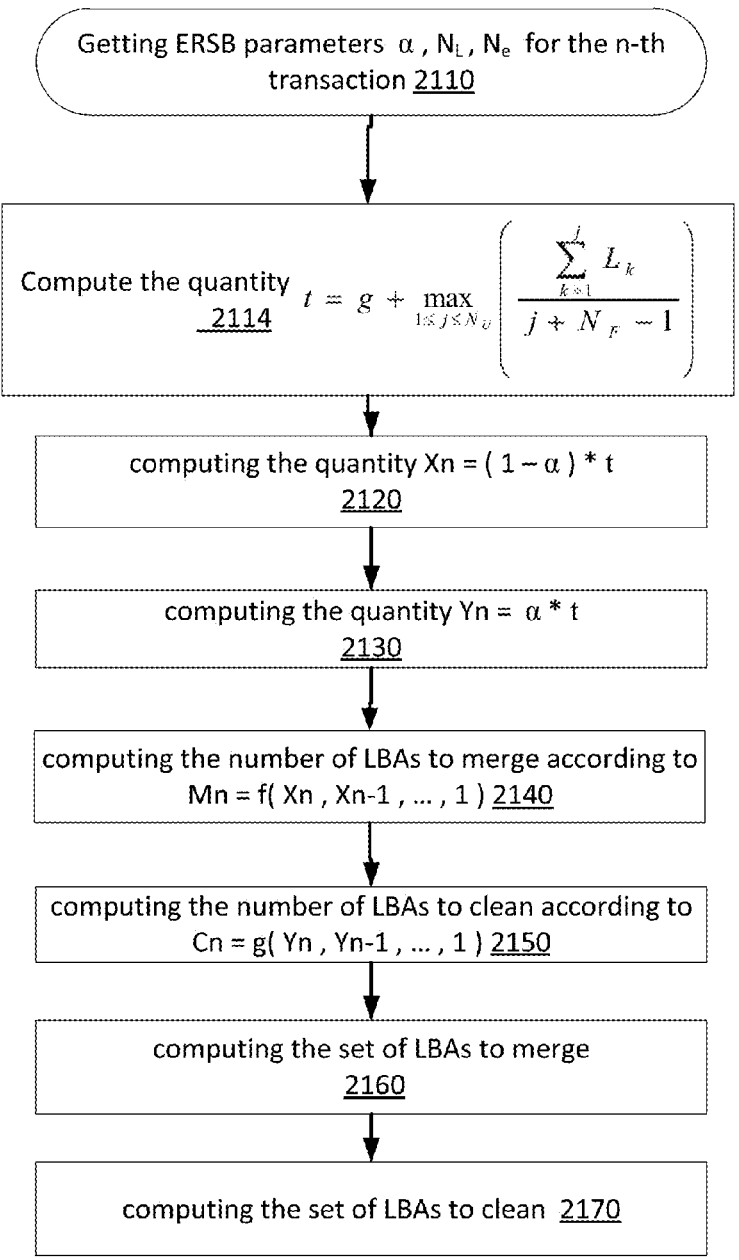
FIG. 21 illustrates a method according to an embodiment of the invention.

FIG. 21 includes a flow chart for computing the set of LBAs which will be merged and the set of LBAs which will be cleaned. Referring to L (k); k=1, 2, . . . , $N_U$ in FIG. 20. Since Xn/Yn may be fractional and the upper integer value mat result in processing excess LBAs, some update of the number of LBAs is required through $M_n=f(X_n, X_{n-1}, \ldots, X_1)$ and $C_n=g(Y_n, Y_{n-1}, \ldots, Y_1)$, as illustrated in FIG. 21.

FIG. 21 includes a flow chart for computing the set of LBAs which will be merged and the set of LBAs which will be cleaned.

Method 2100 of FIG. 21 may include the following sequence of stages:

Stage 2110 of getting ERSB parameters α, NL, Ne for the n-th transaction.

Stage 2114 of calculating t:

$$t = g + \max_{1 \le j \le N_U} \left( \frac{\sum_{k=1}^{j} L(k)}{j + N_F - 1} \right)$$

Stage 2120 of computing the quantity Xn=(1−α)*t.

Stage 2130 of computing the quantity Yn=α*t.

Stage 2140 of computing the number of LBAs to merge according to Mn=f(Xn, Xn−1, . . . , 1).

Stage 2150 of computing the number of LBAs to clean according to Cn=g(Yn, Yn−1, . . . , 1).

Stage 2160 of computing the set of LBAs to merge.

Stage 2170 of computing the set of LBAs to clean.

Method 2100 may not include skipping, in the set of LBAs to clean, LBAs which were not merged since they were last cleaned. Thus—multiple clean operations can occur for a certain LBA between merge operations.

Figure 22:
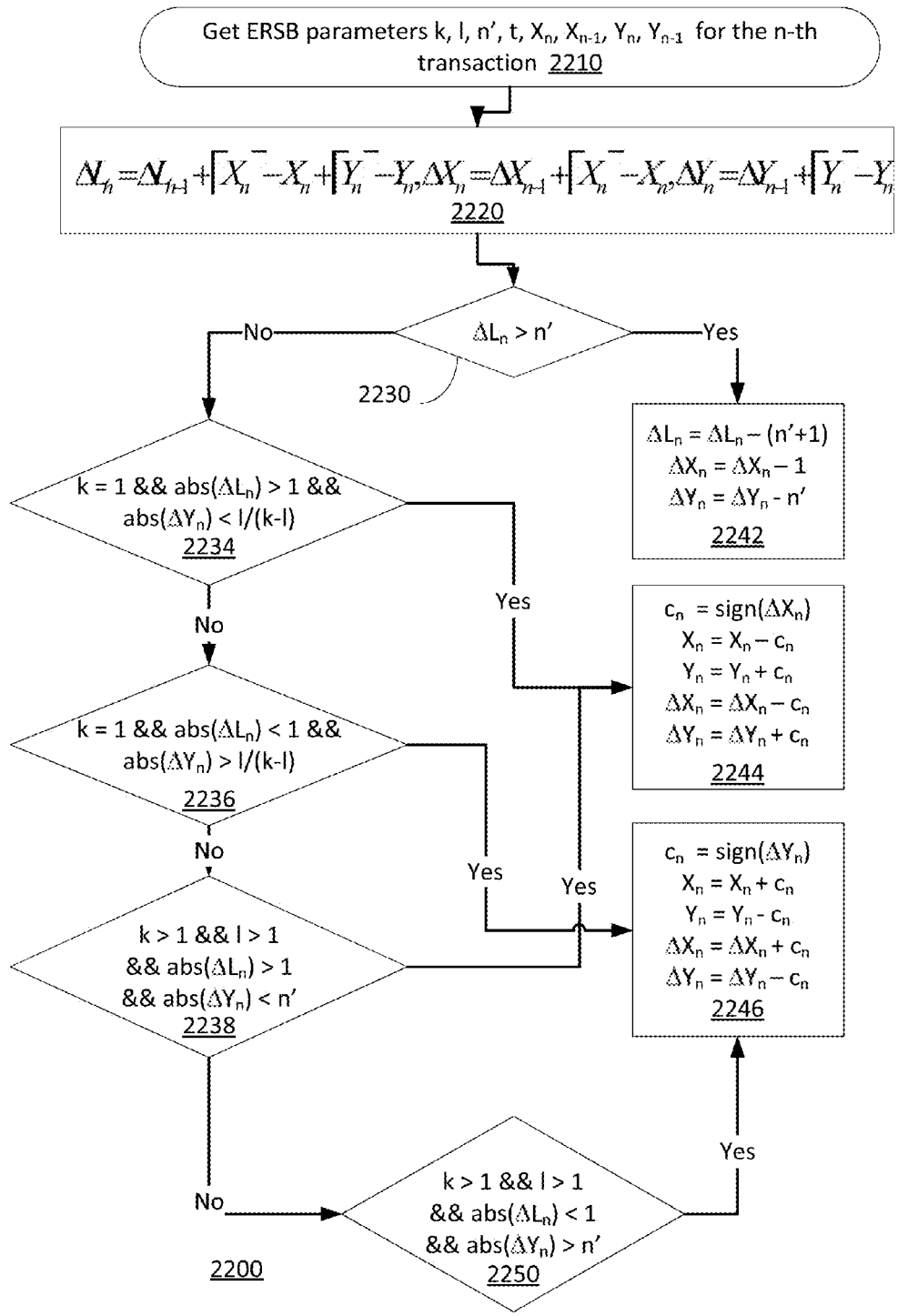
FIG. 22 illustrates a method according to an embodiment of the invention.

FIG. 22 includes an example of implementation of the function f and g through a flow chart for computing and updating the number of LBAs for merge and clean for any rational alpha $$\alpha = \frac{k}{l} \ge \frac{1}{2}.$$

In FIG. 22 n' indicates the nominator of the clean-merge ratio of the form $$\frac{n'}{n'+1} \ge \frac{k}{l}$$

Method 2200 starts by stage 2210 of getting ERSB parameters k, l, n', t, $X_n$, $X_{n-1}$, $Y_n$, $Y_{n-1}$ for the n-th transaction.

Stage 2210 is followed by stage 2220 of calculating:

$$\Delta L_n = \Delta L_{n-1} + \lceil X_n \rceil - X_n + \lceil Y_n \rceil - Y_n,$$

$$\Delta X_n = \Delta X_{n-1} + \lceil X_n \rceil - X_n,$$

$$\Delta Y_n = \Delta Y_{n-1} + \lceil Y_n \rceil - Y_n$$

Stage 2220 is followed by query stage 230 of checking if $\Delta L_n > n'$ If yes—jumping to stage of 2242 of calculating variables:

$\Delta L_n = \Delta L_n - (n'+1)$ $\Delta X_n = \Delta X_n - 1$ $\Delta Y_n = \Delta Y_n - n'$ Stage 2234 includes checking if k=1 and abs($\Delta L_n$)>1 and abs($\Delta Y_n$)<1/(k−1).

If yes—jumping to stage 2244 of calculating variables:

$c_n = \text{sign}(\Delta X_n)$ $X_n = X_n - c_n$ $Y_n = Y_n + c_n$ $\Delta X_n = \Delta X_n - c_n$ $\Delta Y_n = \Delta Y_n + c_n$ If no—jumping to stage 2236 of checking if k=1 and abs($\Delta L_n$)<1 and abs($\Delta Y_n$)>1/(k−1).

If yes—jumping to stage 2246. If no—jumping to stage 2238 of checking if k>1 and l>1 and abs($\Delta L_n$)>1 and abs($\Delta Y_n$)<n'.

If yes—jumping to stage 2244.

If no—jumping to stage 2250 of checking if k>1 and l>1 and abs($\Delta L_n$)<1 and abs($\Delta Y_n$)>n'

Figure 23:
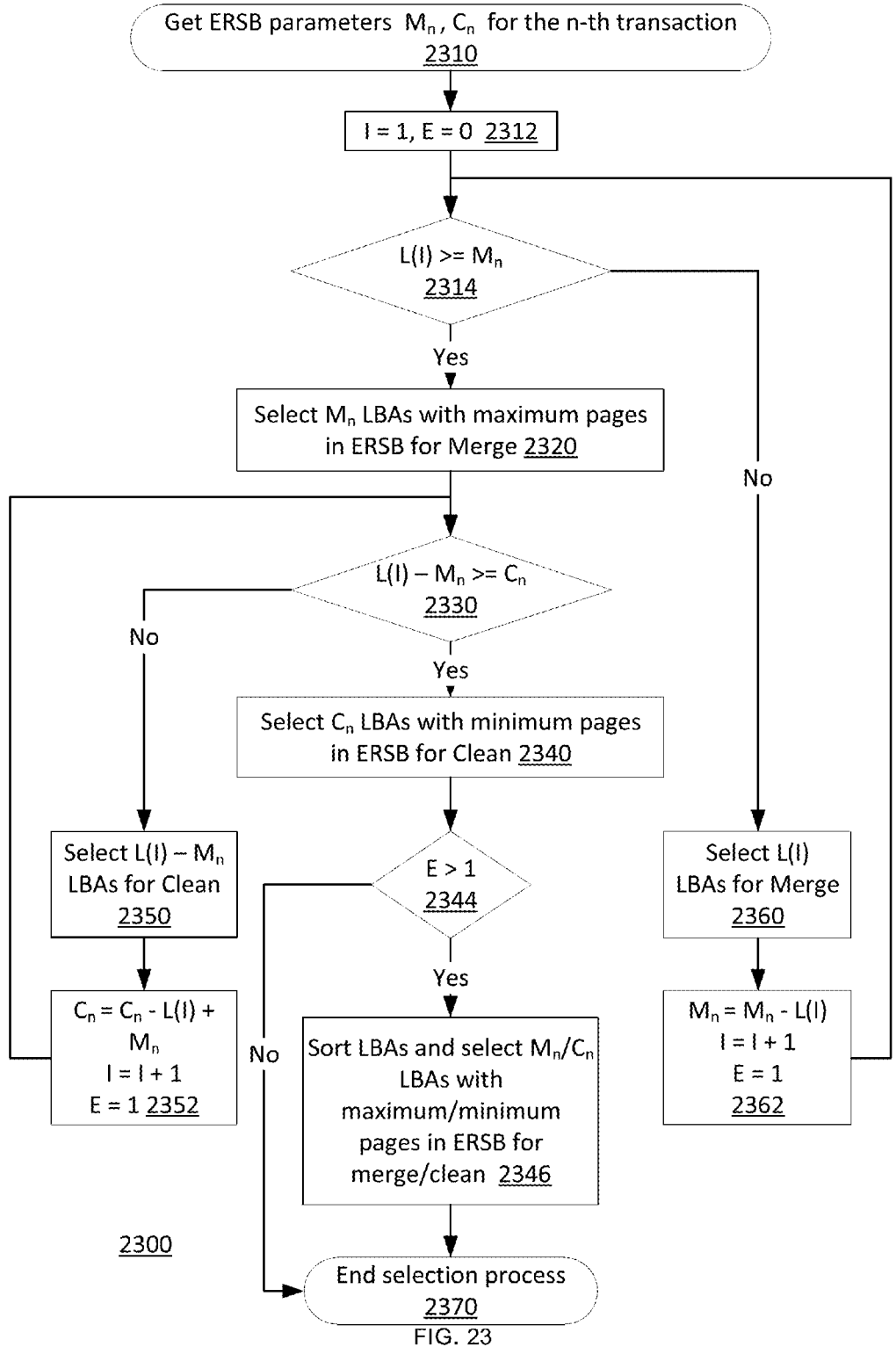
FIG. 23 illustrates a method according to an embodiment of the invention.

If yes—jumping to stage 2246 of calculating variables:

$c_n = \text{sign}(\Delta Y_n)$ $X_n = X_n + c_n$ $Y_n = Y_n - c_n$ $\Delta X_n = \Delta X_n + c_n$ $\Delta Y_n = \Delta Y_n - c_n$ FIG. 23 includes a flow chart for computing the identity of LBAs which will be merged and the identity of LBAs which will be cleaned.

Method 2300 starts by stage 2310 of getting ERSB parameters $M_n$, $C_n$ for the n-th transaction.

Stage 2310 is followed by stage 2312 of setting i=1 and E=0.

Stage 2312 is followed by query stage 2314 of checking if L(i)≥Mn.

If yes—jumping to stage of 2320 of selecting $M_n$ LBAs with maximum pages in ERSB for Merge.

If not—jumping to stage 2360 of Select L(I) LBAs for Merge.

Stage 2320 is followed by query stage 2330 of checking if L(I)−Mn≥Cn.

If yes—jumping to stage 2340 of selecting $C_n$ LBAs with minimum pages in ERSB for Clean.

If no—jumping to stage 2350 of selecting L(I)−$M_n$ LBAs for Clean.

Stage 2340 is followed by stage 2344 of checking if E>1.

If yes—jumping to stage 2346 of sorting LBAs and select $M_n/C_n$ LBAs with maximum/minimum pages in ERSB for merge/clean.

If no—jumping to end of processing in stage 2370.

Stage 2350 is followed by stage 2352 of updating variables: $C_n = C_n - L(I) + M_n$; I=I+1; E=1.

Stage 2360 is followed by stage 2362 of updating variables: $M_n = M_n - L(I)$; I=I+1; E=1.

Stage 2352 is followed by stage 2330. Stage 2362 is followed by stage 2314.

For the ERSB system in FIG. 9, the average IOPS performance when combining merging and cleaning may be approximated by:

Average *IOPS* when combining merging and cleaning for $\alpha \le \frac{1}{2}$ $$OPS\left(\alpha \mid \alpha \le \frac{1}{2}\right) = \frac{1}{1+\alpha} \cdot \frac{(n_E \cdot N_e - g)}{(n_E \cdot N_e - g) \cdot t_w + (1-\alpha) \cdot N_L \cdot t_m}$$

$$= \frac{1}{1+\alpha} \cdot \frac{1}{t_w + (1-\alpha) \cdot \overline{t_m}}$$

Equation 7

Equation 7 is explained by considering the steady state behavior of the ERSB system employing merge and clean. Denote by x the fraction of the data block which is written with pages from the remaining data blocks during the cleaning process.

For the previous invention no LBA was chosen for cleaning unless it has been merged after it had last been cleaned, it follows that at least a fraction of x from all other ERSB data blocks does not contain any pages from the LBAs currently chosen for cleaning.

Therefore, $$\alpha \cdot \frac{n_E}{N_e} \cdot (1-x)$$

pages are copied from each ERSB data block to the new data block. Equating the number of cleaned pages in the new data block x·$n_E$ to the aggregate number of pages copied from all ERSB data blocks yields the relation:

$$x = \frac{\alpha}{1+\alpha}$$

Equation 8: Fraction of the data block, written during the cleaning process, for $$\alpha \le \frac{1}{2}$$

Finally, the IOPS may be given by considering the number of newly written pages (1−x)*$n_E$, and the time required for writing these pages. This time includes writing the entire data block plus the time needed for LBA merge. By substituting α into the resulting expression Equation 2 is obtained.

FIG. 23 depicts the IOPS performance of the representative ERSB system employing combining merging and cleaning according to a certain embodiment of the previous invention with $N_{p_L}$=4096, $N_L$=1795, $n_E$=1376, $N_E$=132, f=19, $t_w$=5.6 [uSec], and $t_m$=1.366 [sec], and α=0.5. The a men of skill in the art may observe the gain of this scheme w.r.t. prior art in terms of increased average IOPS performance and constant instantaneous IOPS performance.

Figure 24:
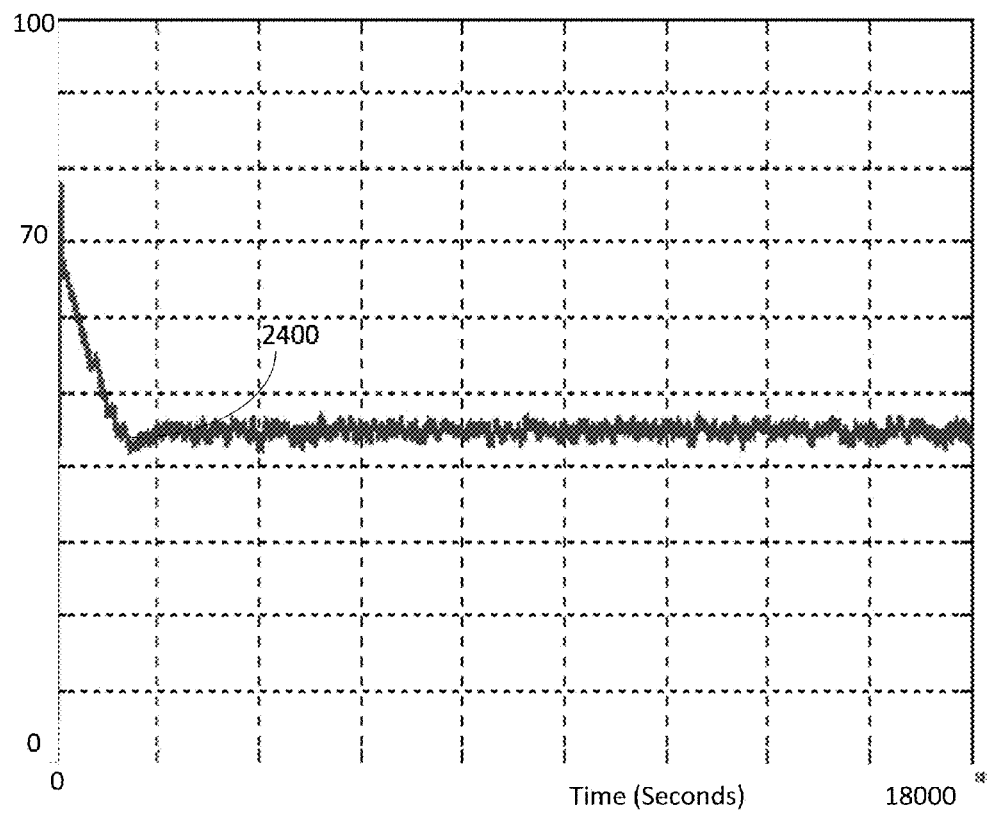
FIG. 24 illustrates the performance of a system according to an embodiment of the invention.

FIG. 24 depicts the IOPS performance of the representative ERSB system employing combining merging and cleaning according to a certain embodiment of the present invention with $N_p$=4096, $N_L$=1795, $n_E$=1376, $N_e$=132, f=19, $t_w$=5.6

[uSec], and $t_m$=1.366 [sec], and $\alpha$=0.8. The a men of skill in the art may observe the additional gain of this scheme w.r.t. the previous invention in terms of increased average IOPS performance.

In one embodiment of the previous invention, the LBAs were chosen for merge according to the number of pages from each LBA which reside in the ERSB and/or the time which passed since the first page of each LBA entered the ERSB. For example, LBAs which have more pages in the ERSB and which reside in the ERSB for a longer period of time are merged sooner than others.

In the present invention it is no longer assumed that no LBA was chosen for cleaning unless it has been merged after it had last been cleaned. This assumption limited the actual clean-merge ratio alpha only to up to ½, which isn't always the optimal clean-merge ratio.

In one embodiment of the present invention any clean-merge ratio in the range $0 \leq \alpha < 1$ is allowed.

In one embodiment of the present invention adaptation of the optimal clean-merge ratio to the system parameters and instantaneous test area is employed.

With a clean-merge ratio of the form $$\alpha = \frac{n}{n+1}; n \geq 0$$

and LBA undergoes, on the average, n clean processes between any two merge processes. Under these conditions, at any point there are, on the average, $$\frac{1}{n+1}$$

of the LBAs currently after $0, 1, \ldots, n-1, n$ clean processes since last merge. Therefore, $$\frac{j \cdot (1-x) \cdot n_E}{(n+1) \cdot N_e}; j = 1, 2, \ldots, n$$

pages are copied from each ERSB data block to the new data block from LBAs, which underwent $0, 1, \ldots, n-1$ clean processes since last merge. Equating the number of cleaned pages in the new data block $x \cdot n_E$ to the aggregate number of pages copied from all ERSB data blocks yields the relation $$x = \frac{n}{n+2} \quad \text{Equation 9}$$

Fraction of the data block, written during the cleaning process, for $\alpha = \frac{n}{n+1}$ For the case of a rational clean-merge ratio $\alpha$, $\alpha$ can always be bounded as:

$$\frac{n}{n+1} \leq \alpha = \frac{k}{l} \leq \frac{n+1}{n+2}; n \geq 0$$

It may be proved that an LBA undergoes, on the average, n or n+1 clean processes between any two merge processes. Under these conditions, at any point there are, on the average, $$\frac{l-k}{l}$$

or the LBAs currently after $0, 1, \ldots, n-1, n$ clean processes since last merge, and $$\frac{k - n \cdot (l-k)}{l}$$

of the LBAs currently after n+1 clean processes since last merge.

Therefore, $$\frac{j \cdot (l-k) \cdot (1-x) \cdot n_E}{l \cdot N_e}; j = 1, 2, \ldots, n$$

pages are copied from each ERSB data block to the new data block from LBAs, which underwent $0, 1, \ldots, n-1$ clean processes since last merge, and $$\frac{j \cdot [k - n \cdot (l-k)] \cdot (1-x) \cdot n_E}{l \cdot N_e}$$

pages are copied from each ERSB data block to the new data block from LBAs, which underwent n clean processes since last merge.

Equating the number of cleaned pages in the new data block $x \cdot n_E$ to the aggregate number of pages copied from all ERSB data blocks yields the relation:

$$x = \frac{(n+1) \cdot \left(\frac{k}{l} - \left(1 - \frac{k}{l}\right) \cdot \frac{n}{2}\right)}{(n+1) \cdot \left(\frac{k}{l} - \left(1 - \frac{k}{l}\right) \cdot \frac{n}{2}\right) + 1} \quad \text{Equation 10}$$

Fraction of the data block, written during the cleaning process, for $a = \frac{k}{l}$ The clean-merge ratio alpha may be defined as a mixture between $$\alpha = \frac{n}{n+1}$$

and $$\alpha = \frac{n+1}{n+2}$$

in the form of Equation 11:

$$\alpha = \frac{k}{l} = p \cdot \frac{n}{n+1} + (1-p) \cdot \frac{n+1}{n+2}; \, p \in [0, 1] \quad \text{Equation 11}$$

Rational clean-merge ratio definition

Employing this allows to relate x to the clean-merge ratio through:

$$x = \frac{(n+1-p) \cdot \frac{1}{2}}{(n+1-p) \cdot \frac{1}{2} + 1} = \frac{n+1-p}{n+3-p} \quad \text{Equation 12}$$

Fraction of the data block, written during the cleaning process, for rational clean-merge ratio Considering the number of newly written pages $(1-x)*n_E$, and the time required for writing these pages, which includes writing the entire data block plus the time needed for LBA merge, yields the IOPS for this system:

$$IOPS\left(\alpha \mid \alpha = p \cdot \frac{n}{n+1} + (1-p) \cdot \frac{n+1}{n+2}; \, p \in [0,1]; \, n \geq 0\right) = \quad \text{Equation 13}$$

$$\frac{1}{(n+3-p)} \cdot \frac{2 \cdot (n+1) \cdot (n+2)}{(n+1) \cdot (n+2) \cdot t_w + (p + (n+1)) \cdot t_m}$$

Average IOPS when combining merging and cleaning for rational alpha

Figure 25:
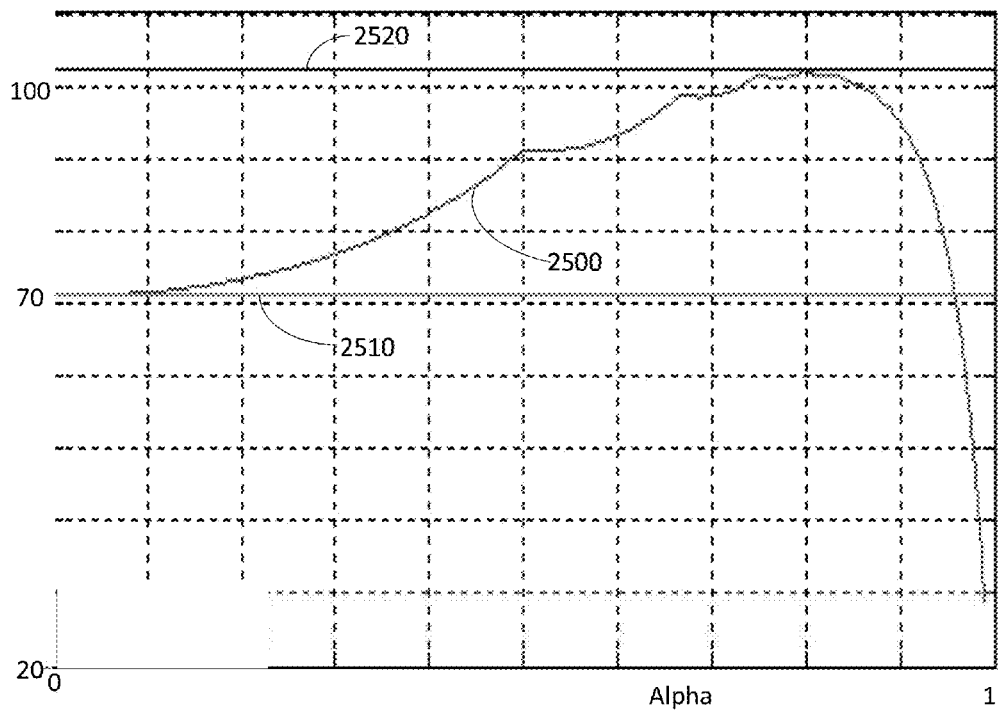
FIG. 25 illustrates the performance of a system according to an embodiment of the invention.

Gathering the IOPS from Equation 13 for n=0, 1, ..., 100 yields the overall performance, illustrated in FIG. 25. The a men of skill in the art may observe the gain of this scheme w.r.t. both prior art and previous inventions, in terms of increased average IOPS performance.

The a men of skill in the art may also observe that Equation 13 allows derivation of the optimum clean-merge ratio for the given system parameters, and calculation of the gain in the optimum clean-merge ratio vs. the alpha=0 clean-merge ratio. For example, curve 2500 of FIG. 25 shows, that alpha that equals 0.8 is the optimum clean-merge ratio for the given system with $N_p=4096$, $N_L=1795$, $n_E=1376$, $N_e=132$, f=19, $t_w=5.6$ [uSec], and $t_m=1.366$ [sec], performing 44% better that at $\alpha=0$ (curve 2510) and 12% better than at alpha=0.5. Curve 2520 illustrates a maximal IOPS value.

In one embodiment of the present invention, the clean-merge ratio is varied according to the instantaneous test area, $N_L$, in order to maximize the performance, as given by Equation 13.

In one embodiment of the present invention, LBAs are chosen for merging/cleaning according to the number of pages from each LBA which reside in the ERSB and on the time which passed since the first page of each LBA entered the ERSB. For example, LBAs which have more/less pages in the ERSB and which reside in the ERSB for a longer/shorter period of time are merged/cleaned sooner than others, respectively.

Employing the nomenclature from a previous invention $N_U$ from Figure denotes the number of used data blocks which may hold valid logical data not including the current block.

The indices 1, 2, ..., $N_U$ may reference the used data blocks according to their age, i.e. for j=1, 2, ..., $N_U$–1, data block j was written prior to data blocks j+1, j+2, ..., $N_U$. Each data block may have pages from one or more LBAs. An LBA is said to be a primary LBA of some data block if the first page written to the ERSB from said LBA was written to said data block. The number of primary LBAs of each of the used data blocks is denoted by L(k), k=1, 2, ..., $N_U$. $N_F=N_E-N_U$ is the number of free data blocks which do not contain any valid data including the current data block which may contain valid data.

In one embodiment of the present invention, a parameter called period may be selected and used as follows. Each period pages written to the ERSB, a new merge/clean fragment may be performed. Whenever a clean/merge of one LBA is complete, another merge/clean of another LBA may commence.

In one embodiment of the present invention all LBAs to be merged are merged before any LBA to be cleaned is cleaned.

In one embodiment of the present invention all LBAs to be cleaned are cleaned before any LBA to be merged is merged.

In one embodiment of the present invention LBAs to be merged and LBAs to be cleaned are processed in an interleaved manner, when some LBAs are merged and then some LBAs are cleaned, until all LBAs are processed.

In one embodiment of the present invention, the number of LBAs, which must be vacated from the oldest ERSB data block or blocks until the newest ERSB data block is filled, may be calculated by:

$$t = g + \max_{1 \leq j \leq N_U} \left( \frac{\sum_{k=1}^{j} L(k)}{j + N_F - 1} \right) \quad \text{Equation 9}$$

Number of LBAs to be vacated from ERSB

In one embodiment of the present invention, the period s may be calculated by:

$$s = \frac{Np - p_c}{f \cdot t \cdot (1-\alpha) + \left\lceil \frac{f \cdot p_c}{N_L} \right\rceil + \delta} \quad \text{Equation 10}$$

Calculation of inter-fragment threshold for merge & clean where $N_F$, $N_p$, L(k), and f are as described above, g is the amount of pages used as a safety gap as described above, $p_C$ is the total amount of pages copied during the clean process, and $\delta$ is the number of additional merge/clean fragments required to complete the merge/clean which is currently ongoing at the time when the calculation of s is performed.

In one embodiment of the present invention, when the nominator of the period s is negative, it is re-calculated through reducing the number of clean processes and increasing the number of merge processes, until it is no longer negative.

In one embodiment of the present invention, the specific selection of LBAs, which undergo merge instead of clean in order to reduce $p_C$ in this case, is of LBAs with minimum number of pages in the ERSB among these LBAs selected for clean.

In one embodiment of the present invention, the pages for clean are grouped into the maximum possible fragment length, in order to reduce the number of fragments for clean.

In one embodiment of the present invention, when the LBAs are not derived from a single ERSB data block, the LBAs may be re-sorted following the original merge/clean LBAs selection strategy. And the selection of which LBAs to merge or clean can be done according to a sorted list of LBAs—the sorting can be done according to any criteria.

In one embodiment of the present invention, when the all LBAs, which were to be merged or cleaned, are handled and the newest ERSB data block is not full yet, no merge/clean is performed until it is full, and new sets of LBAs for merge/clean are calculated. And that newest ERSB block is then used for receiving new data sectors.

In one embodiment of the present invention, a "greedy" clean strategy may be employed, in which only the pages in the oldest ERSB data block or some of the oldest ERSB blocks are copied to the newest ERSB data block. Data from newer ERSB data blocks is not cleaned.

FIG. 26 illustrates method 2600 according to an embodiment of the invention.

Method 2600 may start by stage 2610 of receiving data sectors during a set of at least one write transactions. Each data sector belongs to a memory space portion out of multiple memory space portions.

Stage 2610 may be followed by stage 2620 of writing the data sectors into a buffer of the non-volatile memory module. The buffer may include multiple (Ne) buffer blocks. The multiple ($N_L$) memory space portions includes $\overline{N}_L$ currently buffered memory space portions that are associated with currently buffered data sectors. There are an instantaneous number of currently buffered memory space portions.

Stage 2620 may be followed by stage 2630 of selecting, out of the currently buffered portions, to-be-merged memory space portions and to-be-cleaned memory space portions. The selection is made while trying to maintain a target ratio (alpha) within a range that has an upper limit and a lower limit. The upper limit differs from the lower limit and exceeds one half. Thus—it is possible that more to-be-cleaned memory space portion are selected than to-be-merged memory space portions.

The target ratio is a ratio between (a) a number of to-be-cleaned memory space portions and (b) a sum of the number of to-be-cleaned memory space portions and a number of to-be-merged memory space portions.

The target ratio may represent a desired ratio to be achieved over a time period. For example, method 2600 may be repeated multiple times such as to include receiving data sectors during multiple sets of at least one write transactions. Stages 2630-2630 as well as stages 2640 and 2650 may be repeated multiple times to provide multiple actual ratios (see for example $M_n$ and $C_n$ and the like of stages 2140 and 2150 of FIG. 21, stages 2233 and 2246 of FIG. 22, stages 2310, 2340, 2352, 2362 of FIG. 23) between numbers of to-be-cleaned memory space portions and to-be-merged memory space portions. The target ratio may be calculated by applying a statistical function of the multiple actual ratios. The statistical function may be an average function or any other statistical function.

Stage 2630 may include at least one of the following:
i. Selecting the to-be-merged memory space portions and the to-be-cleaned memory portions based upon a number of buffered data sectors for each of the currently buffered portions.
ii. Selecting the to-be-merged memory space portions as memory space portions that have higher numbers of buffered data sectors in relation to numbers of buffered data sectors of to-be-cleaned memory space portions.
iii. Selecting the to-be-merged memory space portions as memory space portions that have highest numbers of buffered data sectors out of the currently buffered portions.
iv. Selecting the to-be-cleaned memory space portions as memory space portions that have lowest numbers of buffered data sectors out of the currently buffered portions.
v. Selecting the to-be-merged memory space portions and the to-be-cleaned memory portions based upon timings of buffering data sectors that belong to the currently buffered portions.
vi. Selecting the to-be-merged memory space portions as memory space portions that have older buffered data sectors in relation to data sectors of to-be-cleaned memory space portions.
vii. Selecting the to-be-merged memory space portions and the to-be-cleaned memory portions based upon (a) a number of buffered data sectors for each of the currently buffered portions, and (b) timings of buffering data sectors that belong to the currently buffered portions.
viii. Selecting memory space portions that are associated with data sectors stored in an oldest buffer block of the buffer; wherein the oldest buffer block stores an earliest written data sector out of all data sectors currently buffered in the buffer.

Stage 2630 may be followed by stage 2640 of (a) merging, for each to-be-merged memory space portion and before the buffer becomes full, data sectors that belong to the to-be-merged memory space portion into a sequential portion of the non-volatile memory module, wherein the sequential portion differs from the buffer; and (b) copying, for each to-be-cleaned memory space and before the buffer becomes full, data sectors that belong to the to-be-cleaned memory space portion into a buffer block of the buffer.

According to an embodiment of the invention stage 2640 may include stage 2642 of executing multiple merging fragments and wherein the copying comprises executing multiple cleaning fragments.

Stage 2642 may include one out of:
i. Executing the merging fragments and cleaning fragments in an interleaved manner.
ii. Executing the merging fragments and cleaning fragments in a non-interleaved manner. This may include either completing all the merging fragments before starting the cleaning fragments or completing all the cleaning fragments before starting the merging fragments.

Stage 2640 may include checking when the merging and the copying to the buffer block are completed, whether the buffer block is full; and delaying further merging and copying until selecting new to-be-merged memory space portions and new to-be-cleaned memory space portions, if it is determined that the buffer block is not full.

Method 2600 may include stage 2650 of determining an inter-fragment threshold that represents a number of data segments to be written to the buffer between an execution of two consecutive fragments of any type of fragment out of merging fragments and cleaning fragment. Stage 2650 may be executed before starting executing stage 2640, once during the execution of stage 2640 or multiple times during the execution of stage 2640. For simplicity of explanation it is illustrated as being a part of stage 2630.

Stage 2650 may include at least one of the following:
i. Determining the inter-fragment threshold such as to prevent an overflow of the buffer due to (a) a completion of merging and the copying and (b) a reception of new data sectors during the completion of merging and the copying.

ii. Determining the inter-fragment threshold in response to a size of a residual buffer space that is allocated for receiving data sectors during an execution of the merging.

iii. Determining of the inter-fragment threshold is responsive to at least some parameters out of: a number ($n_E$) of data sectors required to fill a buffer block; a size (g) of residual buffer space that is allocated for receiving data sectors during an execution of the merging; a number (Pc) of data sectors copied during an entire cleaning; a number (Nu) of currently not-empty buffer blocks; numbers (L(1)–L(Nu)) of primary memory space portions per each buffer block; wherein a primary memory space portion of a buffer block is a memory space portion of which an earliest written data sector that is still buffered was written to the buffer block; a number (nl) of data sectors per memory space portion; the target ration (alpha); a number (f) of fragments required for completing the merging and the cleaning; a number (NF) of free buffer blocks; and a number (Q) of uncompleted fragments requires for a completion of the merging and copying that are executed when determining of the inter-fragment threshold.

iv. Calculating (see, for example, equation 9) a maximal value (t) out of intermediate values calculated for different values of an index j that ranges between and Nu of a ratio between (a) a sum of primary space portions per buffer block from L(1) to a k'th primary space portion L(k) for index k values ranging between and j plus the residual gap g, and (b) a value of index j plus NF minus 1.

v. Calculating (see, for example equation 10) a first intermediate value that equals $n_E$–Pc.

vi. Calculating (see, for example equation 10) an absolute value (r) of (f*Pc/Np).

vii. Calculating (see, for example equation 10) a second intermediate value that equals f*t*(1-alpha)+Q+r.

viii. Calculating (see, for example equation 10) the inter-fragment threshold by dividing the first intermediate value by the second intermediate value.

ix. Changing a relationship between the number of to-be-merged memory space portions and to-be-cleaned memory space portions if the first intermediate value is negative.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method of managing a non-volatile memory module, the method comprising:
   receiving data sectors during a set of at least one write transactions; wherein each data sector belongs to a memory space portion out of multiple memory space portions;
   writing the data sectors into a buffer of the non-volatile memory module; wherein the buffer comprises multiple buffer blocks; wherein the multiple memory space portions comprise currently buffered memory space portions that are associated with currently buffered data sectors;
   selecting, out of the currently buffered portions, to-be-merged memory space portions and to-be-cleaned memory space portions; wherein a target ratio between (a) a number of to-be-cleaned memory space portions and (b) a sum of the number of to-be-cleaned memory space portions and a number of to-be-merged memory space portions ranges between an upper limit and a lower limit, wherein the upper limit differs from the lower limit and exceeds one half;
   merging, for each to-be-merged memory space portion and before the buffer becomes full, data sectors that belong to the to-be-merged memory space portion into a sequential portion of the non-volatile memory module, wherein the sequential portion differs from the buffer;
   copying, for each to-be-cleaned memory space and before the buffer becomes full, data sectors that belong to the to-be-cleaned memory space portion into a buffer block of the buffer.

2. The method according to claim 1 wherein the target ratio exceeds 0.75.

3. The method according to claim 1 wherein the target ratio exceeds 0.8.

4. The method according to claim 1 comprising selecting the to-be-merged memory space portions and the to-be-cleaned memory portions based upon a number of buffered data sectors for each of the currently buffered portions.

5. The method according to claim 1 comprising selecting the to-be-merged memory space portions as memory space portions that have higher numbers of buffered data sectors in relation to numbers of buffered data sectors of to-be-cleaned memory space portions.

6. The method according to claim 1 comprising selecting the to-be-merged memory space portions as memory space portions that have highest numbers of buffered data sectors out of the currently buffered portions.

7. The method according to claim 1 comprising selecting the to-be-cleaned memory space portions as memory space portions that have lowest numbers of buffered data sectors out of the currently buffered portions.

8. The method according to claim 1 comprising selecting the to-be-merged memory space portions and the to-be-cleaned memory portions based upon timings of buffering data sectors that belong to the currently buffered portions.

9. The method according to claim 1 comprising selecting the to-be-merged memory space portions as memory space portions that have older buffered data sectors in relation to data sectors of to-be-cleaned memory space portions.

10. The method according to claim 1 comprising selecting the to-be-merged memory space portions and the to-be-cleaned memory portions based upon (a) a number of buffered data sectors for each of the currently buffered portions, and (b) timings of buffering data sectors that belong to the currently buffered portions.

11. The method according to claim 1 comprising:
receiving data sectors during multiple sets of at least one write transactions; and
repeating the writing, the selecting, the merging and the copying for each set of at least one write transactions to provide multiple actual ratios between numbers of to-be-cleaned memory space portions and to-be-merged memory space portions;
wherein the target ratio between each number of to-be-cleaned memory space portions and each number of to-be-merged memory space portions is a statistical function of the multiple actual ratios.

12. The method according to claim 11 wherein the statistical function is an average.

13. The method according to claim 1 wherein the merging comprises executing multiple merging fragments and wherein the copying comprises executing multiple cleaning fragments.

14. The method according to claim 13 wherein the multiple merging fragments and multiple cleaning fragments are executed in an interleaved manner.

15. The method according to claim 14 wherein the multiple merging fragments and multiple cleaning fragments are executed in a non-interleaved manner.

16. The method according to claim 14 comprising determining an inter-fragment threshold that represents a number of data segments to be written to the buffer between an execution of two consecutive fragments of any type of fragment out of merging fragments and cleaning fragment.

17. The method according to claim 16 comprising determining the inter-fragment threshold such as to prevent an overflow of the buffer due to (a) a completion of merging and the copying and (b) a reception of new data sectors during the completion of merging and the copying.

18. The method according to claim 16 wherein the determining of the inter-fragment threshold is responsive to a size of a residual buffer space that is allocated for receiving data sectors during an execution of the merging.

19. The method according to claim 16 wherein the determining of the inter-fragment threshold is responsive to at least some parameters out of:
a number (Np) of data sectors required to fill the buffer block;
a size (g) of residual buffer space that is allocated for receiving data sectors during an execution of the merging;
a number (Pc) of data sectors copied during an entire cleaning;
a number (Nu) of currently not-empty buffer blocks;
numbers (L(1)–L(Nu)) of primary memory space portions per each buffer block; wherein a primary memory space portion of a buffer block is a memory space portion of which an earliest written data sector that is still buffered was written to the buffer block;
a number (nl) of data sectors per memory space portion;
the target ratio (alpha);
a number (f) of fragments required for completing the merging and the cleaning;
a number (NF) of free buffer blocks; and
a number (Q) of uncompleted fragments requires for a completion of the merging and copying that are executed when determining of the inter-fragment threshold.

20. The method according to claim 19 wherein the determining of the inter-fragment threshold comprises calculating a maximal value (t) out of intermediate values calculated for different values of an index j that ranges between 1 and Nu of a ratio between a sum of primary space portions per buffer block from L(1) to a k'th primary space portion L(k) for index k values ranging between and j plus g, and (b) a value of index j plus NF minus 1.

21. The method according to claim 20 wherein the determining of the inter-fragment threshold comprises: calculating a first intermediate value that equals Np−Pc; calculating r wherein r is an absolute value of (f*Pc/Np); calculating a second intermediate value that equals f*t*(1-alpha)+Q+r; and calculating the inter-fragment threshold by dividing the first intermediate value by the second intermediate value.

22. The method according to claim 20 comprising changing a relationship between the number of to-be-merged memory space portions and to-be-cleaned memory space portions if the first intermediate value is negative.

23. The method according to claim 1 comprising selecting memory space portions that are associated with data sectors stored in an oldest buffer block of the buffer; wherein the oldest buffer block stores an earliest written data sector out of all data sectors currently buffered in the buffer.

24. The method according to claim 1 comprising checking when the merging and the copying to the buffer block are completed, whether the buffer block is full; and delaying further merging and copying until selecting new to-be-merged memory space portions and new to-be-cleaned memory space portions, if it is determined that the buffer block is not full.

25. A non-transitory computer readable medium that stores instructions that once executed by a memory controller cause the memory controller to: receive data sectors during a set of at least one write transactions; wherein each data sector belongs to a memory space portion out of multiple memory space portions; write the data sectors into a buffer of the non-volatile memory module; wherein the buffer comprises multiple buffer blocks; wherein the multiple memory space portions comprise currently buffered memory space portions that are associated with currently buffered data sectors; select, out of the currently buffered portions, to-be-merged memory space portions and to-be-cleaned memory space portions; wherein a target ratio between (a) a number of to-be-cleaned memory space portions and (b) a sum of the number of to-be-cleaned memory space portions and a number of to-be-merged memory space portions ranges between an upper limit and a lower limit, wherein the upper limit differs from the lower limit and exceeds one half; merge, for each to-be-merged memory space portion and before the buffer becomes full, data sectors that belong to the to-be-merged memory space portion into a sequential portion of the non-volatile memory module, wherein the sequential portion differs from the buffer; and copy, for each to-be-cleaned memory space and before the buffer becomes full, data sectors that belong to the to-be-cleaned memory space portion into a buffer block of the buffer.

26. A system, comprising an interface and a memory controller;
   wherein interface is arranged to receive data sectors during a set of at least one write transactions; wherein each data sector belongs to a memory space portion out of multiple memory space portions;
   wherein the memory controller is arranged to:
      write the data sectors into a buffer of a non-volatile memory module; wherein the buffer comprises multiple buffer blocks; wherein the multiple memory space portions comprise currently buffered memory space portions that are associated with currently buffered data sectors;
      select, out of the currently buffered portions, to-be-merged memory space portions and to-be-cleaned memory space portions; wherein a target ratio between (a) a number of to-be-cleaned memory space portions and (b) a sum of the number of to-be-cleaned memory space portions and a number of to-be-merged memory space portions ranges between an upper limit and a lower limit, wherein the upper limit differs from the lower limit and exceeds one half;
      merge, for each to-be-merged memory space portion and before the buffer becomes full, data sectors that belong to the to-be-merged memory space portion into a sequential portion of the non-volatile memory module, wherein the sequential portion differs from the buffer;
      copy, for each to-be-cleaned memory space and before the buffer becomes full, data sectors that belong to the to-be-cleaned memory space portion into a buffer block of the buffer.

* * * * *